(12) United States Patent
Maienschein et al.

(10) Patent No.: US 6,244,401 B1
(45) Date of Patent: Jun. 12, 2001

(54) FORCE TRANSMITTING APPARATUS

(75) Inventors: Stephan Maienschein, Bühl; Marc Meisner, Bühl Weitenung; Rudolf Hönemann, Ottersweier, all of (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/305,504

(22) Filed: May 5, 1999

(30) Foreign Application Priority Data

May 6, 1998 (DE) .............................................. 198 20 128
Jun. 18, 1998 (DE) .............................................. 198 27 127

(51) Int. Cl.$^7$ .................................................. F16H 45/02
(52) U.S. Cl. .................... 192/3.3; 192/70.17; 192/213.1; 464/66
(58) Field of Search .................... 192/3.28, 3.29, 192/3.3, 70, 17, 212, 213, 213.1; 464/66, 67

(56) References Cited

U.S. PATENT DOCUMENTS

| 4,138,003 | * | 2/1979 | Malloy | 192/3.29 |
| 4,347,717 | * | 9/1982 | Lamarche | 192/213.1 X |
| 5,667,042 | * | 9/1997 | Olsen et al. | 192/3.29 |
| 5,975,261 | * | 11/1999 | Woerner et al. | 192/3.29 |

* cited by examiner

Primary Examiner—Richard M. Lorence
(74) Attorney, Agent, or Firm—Darby & Darby

(57) ABSTRACT

A torque-transmitting apparatus for motor vehicles includes a hydrokinetic torque converter with a housing connected to the driving shaft of an engine. The housing contains a pump and a turbine, the latter arranged to drive an input shaft of a power train. At least one damper is arranged in the power flow path between the turbine and a rotary output element of the apparatus. The damper has an input member constrained to rotate with the turbine and an output member connected to the rotary output element. The input member and the output member are rotatable relative to each other against the opposing forces of energy-storing devices arranged between the input member and the output member. The input member has a radially outer portion in form-locking engagement with the turbine.

49 Claims, 11 Drawing Sheets

FORCE TRANSMITTING APPARATUS

BACKGROUND OF THE INVENTION

The invention relates to a torque-transmitting apparatus with a fluid-operated torque coupler such as, e.g., a fluid coupling or a hydrodynamic torque converter, with at least one housing that can be connected to a driving shaft of a prime mover. The housing contains at least one impeller pump receiving torque from the housing and a turbine that is connected to the input shaft, such as a transmission shaft, of a power train to be driven. Also, if applicable, the housing contains at least one stator arranged between the pump and the turbine. Further, at least one damper is arranged in the power flow between the turbine and a rotary output element of the device. The damper has an input member constrained to rotate together with the turbine and an output member connected to the rotary output element. The input member and the output member are rotatable relative to each other at least against the opposition of a restoring force furnished by energy-storing devices arranged between them.

Torque-transmitting apparatuses of this kind have been proposed, e.g., in DE-OS 195 14 411. To allow rotational displacement of the input and output members relative to each other, it is customary for torque-transmitting apparatuses of this kind to be equipped with a hub that has a toothed internal profile establishing a positive engagement with the transmission shaft and also a toothed external profile which mates with a further component, normally a further hub that carries the turbine and has a toothed internal profile, with play between the flanks of the mating teeth. When a lockup clutch is added that is activated by an axial control piston, there needs to be a corresponding axial space to allow for the axial travel of the hub containing the two toothed profiles. The manufacture of hubs of this kind is complex and therefore expensive. Furthermore, due to the required axial dimension, longer transmission shafts will be needed. Added to this is the difficulty of connecting bulky hub components with the filigreed construction of the turbine shell. Also, dampers that extend far in the radial direction have a tendency to wobble. If in an attempt to solve these problems, the damper is axially docked to the turbine along two or more perimeters of different radii, this will cause undesirable stresses and frictional losses in the damper.

OBJECTS OF THE INVENTION

It is therefore an object of the present invention to improve the design of a torque-transmitting apparatus in a manner that allows a stress-free accommodation of the damper as well as economical and technical improvements in the manufacturing process for torque-transmitting apparatuses of this kind. According to a further object of the invention, the device is to be manufacturable in such a manner that a modular assembly without time-consuming fastening operations can be performed during final assembly. Also required of the torque-transmitting apparatus are the capabilities to transfer torque of high magnitude and to attenuate rotational perturbations over a broad RPM range. Besides, the unit is to meet the objectives that it will minimize wear and prolong the useful life of the overall system of which it is a part.

SUMMARY OF THE INVENTION

The invention is embodied in a torque-transmitting apparatus of the kind that has a fluid-operated torque coupler such as a hydrodynamic torque converter or a similar device comprising

- at least one housing that can be connected to a driving shaft of a prime mover,
- at least one pump that is arranged inside of and driven by the housing,
- a turbine that is connected to and drives the input shaft of a power train such as a transmission shaft and also, if applicable,
- at least one stator arranged between the pump and the turbine, and further
- at least one damper arranged in the torque-flow path between the turbine and a rotary output element of the apparatus, with an input member of the damper being constrained to rotate together with the turbine and an output member of the damper being connected to the rotary output element, the input member and the output member being at least rotatable relative to each other at least against the opposition of the restoring force exerted by energy-storing devices arranged between them.

In accordance with one presently preferred embodiment of the improved torque-transmitting apparatus, the damper at its outside perimeter is directly or indirectly connected to the turbine through a positive rotational constraint. This connection may be free of play relative to coaxial rotational displacements but may allow an axial displacement of the turbine and the input member of the damper relative to each other. For example, the connection may be axially displaceable by means of an axial plug-in connection with the damper rigidly attached to a hub. The problem can further be solved through a torque-transmitting apparatus with a damper whose connection to the turbine shell or turbine, or to the hub, is rotationally fixed both along an inside and outside perimeter, while in the axial direction the connection is fixed only along one perimeter, either on the hub or on the turbine shell, so that axial stresses are relieved by an axial displacement at the axially nonrestrained connection.

In accordance with a further inventive concept, there may also be an axially and rotationally fixed connection at the outside perimeter of the damper in which case, in order to prevent stresses in the damper, the inside perimeter of the damper may be designed to be axially displaceable, e.g., in an arrangement where the damper, by means of a positive circumferential coupling such as a toothed profile, engages a complementary profile on the hub. In addition, the profile on the hub may be axially fixed but rotatable on a complementary profile of the turbine hub on which the turbine is seated, with the amount of rotational play designed to be at least equal to the working range, i.e., the effective angular range, of the damper. The play in the form-fitting engagement between the turbine hub and the hub may also be obtained through additional devices such as window-like openings that are distributed over the circumference of the hub and are engaged with angular play by a corresponding series of axially directed projections on the turbine hub.

With particular advantage, the connection between the turbine and the input member of the damper is accomplished through welding processes such as laser welding, impulse welding, or resistance welding, in which case the damper can be centered on the hub by means of a disk-shaped part that holds the energy-storing devices, or on the turbine shell, e.g., by providing the turbine shell with a series of projections that are distributed over the circumference and that may also serve as locating references for the weld.

It is advantageous for the torque-transmitting apparatus to be provided with a lockup clutch arranged in the torque-flow path between the driving shaft and the damper, in which case it has proved to be beneficial if the lockup clutch, by means of friction linings or laminar disks, establishes a positive engagement with a housing surface and transfers the torque to be transmitted directly to the input member of the damper. Thus, when the lockup clutch is engaged, the torque converter is bypassed and the torque to be transmitted is introduced directly into the damper and from there to the rotary output element and subsequently to the transmission shaft. When the lockup clutch is disengaged, the turbine will impart the torque that has been converted—in most cases amplified through the effect of the stator—to the input member of the damper from where the torque will follow the same path as has been previously described.

The clutch can be engaged and disengaged through an axially moveable control piston that is controlled by an application of pressure. It is advantageous if the control piston defines a plenum chamber which, in the engaged state of the lockup clutch, is essentially sealed tight against the interior space of the housing (except for insignificant flows of pressure medium into the housing that may be provided to cool the friction linings) and is energized by a pressure medium identical to the converter fluid that is admitted through a bore hole, whereby a pressure force is applied to the piston in the axial direction towards the turbine. According to the invention, this axial displacement is compensated by allowing an axial displacement of the axial plug-in connection. Another possibility for controlling the piston is to apply an over pressure to the control piston, in which case the piston will seal off the chamber when the clutch is open; and when the pressure in the chamber is reduced, the piston is pushed to the housing wall by the fluid pressure in the torque converter, thereby causing the lockup clutch to engage.

The control piston can be centered on the transmission shaft, on a hub holding the housing of the torque converter, or on another appropriate part of the apparatus and is preferably provided with sealing means at the interface surfaces to these components for the purpose of sealing the plenum chamber in the same manner as the piston can be sealed at its outside perimeter against the housing.

A further embodiment comprises a form-fitting engagement between the control piston and the housing by means of complementary profiles extending in the axial direction, in which case the axial profile is formed by alternating ridges and grooves in the shape of ring segments that are distributed over a perimeter where, e.g., the ridges of the control piston may engage the grooves in the housing. An advantage of such configuration is the direct engagement of the piston with the housing so that the piston can transmit torque to the friction linings directly and/or through other pressure-transmitting devices, whereby the use of an enlarged friction surface and/or of a larger number of friction surfaces and thus a greater transmission torque is made possible.

For this purpose, there may be one or more carriers of friction linings in the form of annular disks or laminar disks that can carry friction linings in the outer zones of their axially facing surfaces. The friction-lining carriers or laminar disks are axially movable, and the pressure force is applied against a ring-shaped pressure plate that is connected with the housing either directly or indirectly, e.g., welded, riveted or attached to a flange that is, in turn, connected to the housing. For better cooling fluid distribution, the pressure plate can have one or more circles of holes.

It is advantageous to center the friction-lining carrier on the housing. For this purpose, the friction-lining carrier can be provided with lugs that protrude axially towards the housing and are inserted in a shoulder extending in the direction away from the friction-lining carrier.

A further advantageous embodiment renders it possible to configure the piston itself as the lockup clutch or, more precisely, as the friction-lining carrier. For this, the radially outer part of the control piston surface that faces axially towards the housing carries a ring-shaped friction lining that may be provided with an optimized surface finish to achieve better cooling. The piston surface may be bent in the axial direction towards the turbine, so that the piston may rest in form-fitting contact against the housing, which in the respective surface portion is shaped similar to a cone shell.

As already described above, the lockup clutch is connected through one of its components to the input member of the damper. In one embodiment, the connecting part may be the control piston itself in the manner described above, in which case the piston may be connected to lateral parts of the input member by rivets, weld joints or similar means. A further embodiment employs a ring-shaped friction-lining carrier that may form an axial plug-in connection by virtue of an appropriately shaped lateral portion. In this case the friction-lining carrier has a form-fitting engagement with the input member of the damper, e.g., by means of internal teeth at its inside perimeter and, e.g., an axially oriented profile on the lateral part of the input member. The advantages of axial plug-in connections in accordance with the invention are that they compensate for axial displacements and facilitate the manufacturing process by virtue of a modular configuration, because systems of this kind can be built by plug-in assembly without further resort to fastening undertakings such as, e.g., welding or riveting, thus allowing the use of work stations that are not equipped with the respective infrastructure.

Further advantageous embodiments of axial plug-in connections between components of the damper and components of the turbine will be described hereinafter. An advantageous configuration has two components of the two units to be connected meeting each other approximately at a right angle, i.e., in the form of a radially and an axially extending flange, respectively, with the two parts in a form-fitting engagement. In this, it may be advantageous to provide the radially extending flange with external teeth and the axially extending flange with axially oriented teeth.

It may also be advantageous if a radially extending flange-like part has closed cutouts, distributed along a circle of smaller radius than the outside perimeter, that are engaged by axially directed extremities of the axially extending flange-like part.

A preferred embodiment may be a radially oriented flange-like part that, starting at its inside perimeter, follows the shape of the turbine shell outwards in the radial direction and is attached in this portion, e.g., welded or riveted. From there, the flange-like part bends into the radial direction and has a toothed profile along its exterior circumference that is engaged by the lateral part of the input member of the damper. For this purpose, the lateral part at its exterior circumference bends into the axial direction and forms the axially directed flange-like part that carries, e.g., the axially oriented toothed profile.

A further advantageous embodiment may include a flange-like part in the shape of an annular disk that adjoins along its inside perimeter the turbine shell and conforms to the shape of the turbine shell towards the inside in the radial direction, is attached in the shape-conforming portion as described above and then curves into the axial direction. The profile facing away from the turbine shell in axial direction, e.g., a toothed profile, engages in closed recesses distributed over the circumference of a radially directed lateral part and in this manner forms an axial plug-in connection. To form this plug-in connection, it may be necessary for the axially directed toothed profile to pass through the output member before engaging the input member of the damper, given that the output member is interposed axially between the turbine and the input member. For this purpose, the output member has a circular arrangement of elongated holes matching the number of teeth. The angular width of the holes corresponds to the maximum angular displacement of the input and output members relative to each other so that at the same time the elongated holes in combination with the axially directed teeth of the axially oriented flange-like part that is connected to the turbine form at least one stop for the angular displacement of the damper.

In an advantageous arrangement, the axially extending flange-like part can itself be in the form of a hub that carries the turbine, the latter being connected to the hub by, e.g., welding or riveting. The hub carrying the turbine, in turn, can be seated on a further hub that performs the function of the rotary output element and is attached to the transmission shaft. The axially extending flange-like part has a profile established, e.g., by axially oriented teeth that extend into enclosed cutouts corresponding to the number of teeth in the flange whereby an axial plug-in connection is formed. Depending on the configuration of the damper, it may be necessary with this embodiment, too (as described above), to provide in the output member an appropriate arrangement of elongated holes which, in combination with the axially directed profile of the axially oriented flange for the axial plug-in connection, can function as stops for the relative displacement between the input and output members of the damper. The output member, being a radial extension of the hub that is attached to the transmission shaft, may also be configured as a separate flange-like part, in which case the flange needs to be centered on the hub and attached through a rotationally fixed connection.

It can further be advantageous if an annular disk in the form of a radially extending flange-like part with an exterior profile, e.g., an arrangement of external teeth, is centered on the hub that carries the turbine. By attachment means such as, e.g., rivets, the annular disk is rotationally tied to the turbine, and its outward-pointing teeth, mentioned above by way of an example, engage a lateral part that is bent in the axial direction along the interior perimeter and (also by way of example) has a complementary, axially directed toothed profile. In this case, too, a connection is established that constrains rotational but allows translational displacement of the engaged parts relative to each other. The angular displacement of the damper may advantageously be defined by means of a toothed profile with play between the respective tooth flanks of the hub and the annular disk. The outward-facing profile of the hub may also be engaged by the inward-facing profile of the output member, albeit without play at the flanks, in order to secure the output member for rotation with the hub. This has the advantage of saving space in the axial direction of the hub, given that the relative axial displacement occurring between the damper and the turbine as a result of the axial movement of the control piston is already compensated for by the axial plug-in connection.

The axial plug-in connection between the damper and the turbine in different practical variations may be arranged, e.g., at a radial distance beyond the energy-storing devices, at an intermediate radius between the storage devices in the case of at least two damper stages, or inside the radial distance of the storage devices.

Other embodiments of the invention concern the advantageous design of the damper. The damper may be of the single-stage or multi-stage type. A dual-stage damper may be configured in such a way that the damper stages can function in a serial or parallel mode, with the additional possibility of different limits of rotation so that, e.g., in a serial arrangement of the damper stages the relative rotation of one stage is stopped before the other stage, e.g., for the purpose of achieving particular damping characteristics.

In connection with the damper, it is also advantageous to combine different energy-storing devices, e.g., by selecting arc-shaped springs in a radially exterior damper stage, and short, stiff spring elements for use in smaller-diameter areas so that, e.g., a damper characteristic can be achieved that provides a high amount of energy to compensate for both large-amplitude rotational irregularities at low RPM and small-amplitude rotational irregularities at high RPM. In this kind of an arrangement, the arc-shaped springs in the radially exterior area may be pre-bent to their working diameter and are retained radially by a chamber that is formed by at least one lateral part or by other components of the damper or of the torque-transmitting apparatus, e.g., by the wall of the housing. In addition, there may be wear-reducing components such as wear-protection shells interposed between the arc-shaped springs and the chamber, with the characteristic of the arc-shaped spring being determined by all of the aforementioned factors.

It can be advantageous to provide the individual damper stages with displacement properties that depend on the direction from which the torque is introduced. Thus, the damper system may be designed to function in two stages in the "pull" mode and in one stage in the "push" mode. In this manner, the damper characteristic may be adapted to the possibility of hard transient peaks in the torque-flow that are introduced from the "push" side, i.e., from the input shaft of the transmission, in which case, e.g., the soft damper stage is bypassed completely and the firm damper stage is effective instantly. The bypass can accomplished by means of limit stops that block angular displacement against the drive direction in the input and output members of the damper stage that is inactive in the push mode.

It is advantageous to accommodate the storage devices in disk-shaped parts that have dimensionally matched recesses into which the storage devices are fitted and which may at their ends have force-introduction elements facing against the direction of the restoring force. The force-introduction elements retain and thereby compress the storage devices when the input and output members are displaced in relation to each other. The disk-shaped parts forming the input and output members may be arranged in such a manner that either the input or output member is formed by two mutually connected lateral parts, while the other of the two members is formed by a corresponding disk-shaped, flange-like part arranged between the two lateral parts. A further embodiment that brings cost advantages has two disk-shaped parts, one representing a lateral part serving as input member and the other representing a lateral part serving as output member. In two-stage dampers, it can further be cost-effective to use a common disk-shaped part working with both damper stages.

Further in the interest of optimizing cost, the disk-shaped parts may take on additional functions. For example, as mentioned already, one or more disk-shaped parts may form a chamber for the energy storing devices, or they may contain the axial plug-in connection between the damper and the turbine, and/or they may perform other functions.

It is further advantageous for cost-optimization if disk-shaped parts and different other components are made of one piece. Thus, e.g., the output member of the damper together with the rotary output element (e.g., the hub that is arranged on the transmission shaft), or the output member together with the hub that carries the turbine, may be made of one piece.

An advantageous and cost-effective embodiment of means for limiting the extent of angular displacement avoids the need for special stops. For this purpose, a circular arrangement of elongated holes may be provided on at least one disk-shaped part, where the fasteners (e.g., rivets) that are in any case already provided pass through the holes and are held on the opposite side by another disk-shaped part and/or by means of a sheet metal holder. The angular width of the elongated holes is preferably selected so that the extent of relative angular displacement between the input member and the output member is limited by the ends of the elongated holes stopping the shafts of the fasteners.

It is advantageous to provide displacement-limiting stops insofar as a damper or either some or all of the damper stages can be bypassed, so that the damper or the damper stages can be protected from wear. This may apply particularly in the case of wear-prone versions with storage devices that, e.g., contain arc-shaped springs, permit large angular displacements, and/or are exposed to strong shock loads. To guard against premature failure, it is advantageous if initially one damper stage is totally bypassed by means of displacement-limiting stops, while the second stage is either not bypassed at all or only at a later point. When a damper or a damper stage reaches its limit stop, the torque that previously entered into the energy-storing device is transmitted through the stop directly to the output member of the bypassed damper or damper stage. It may also be advantageous to provide different angular displacement limits in the damper device and its damper stages depending on the direction of the torque, i.e., whether the torque works in the pull or push direction, respectively. Thus, it may be advantageous, for example, to provide limit stops in such a manner that a damper stage is entirely bypassed in the costing mode. Likewise, there may be advantages to a configuration in which, e.g., one damper stage works only in the coasting direction while the other stage works only in the pull direction.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DETAILED DESCRIPTION OF THE INVENTION

Figure 1:
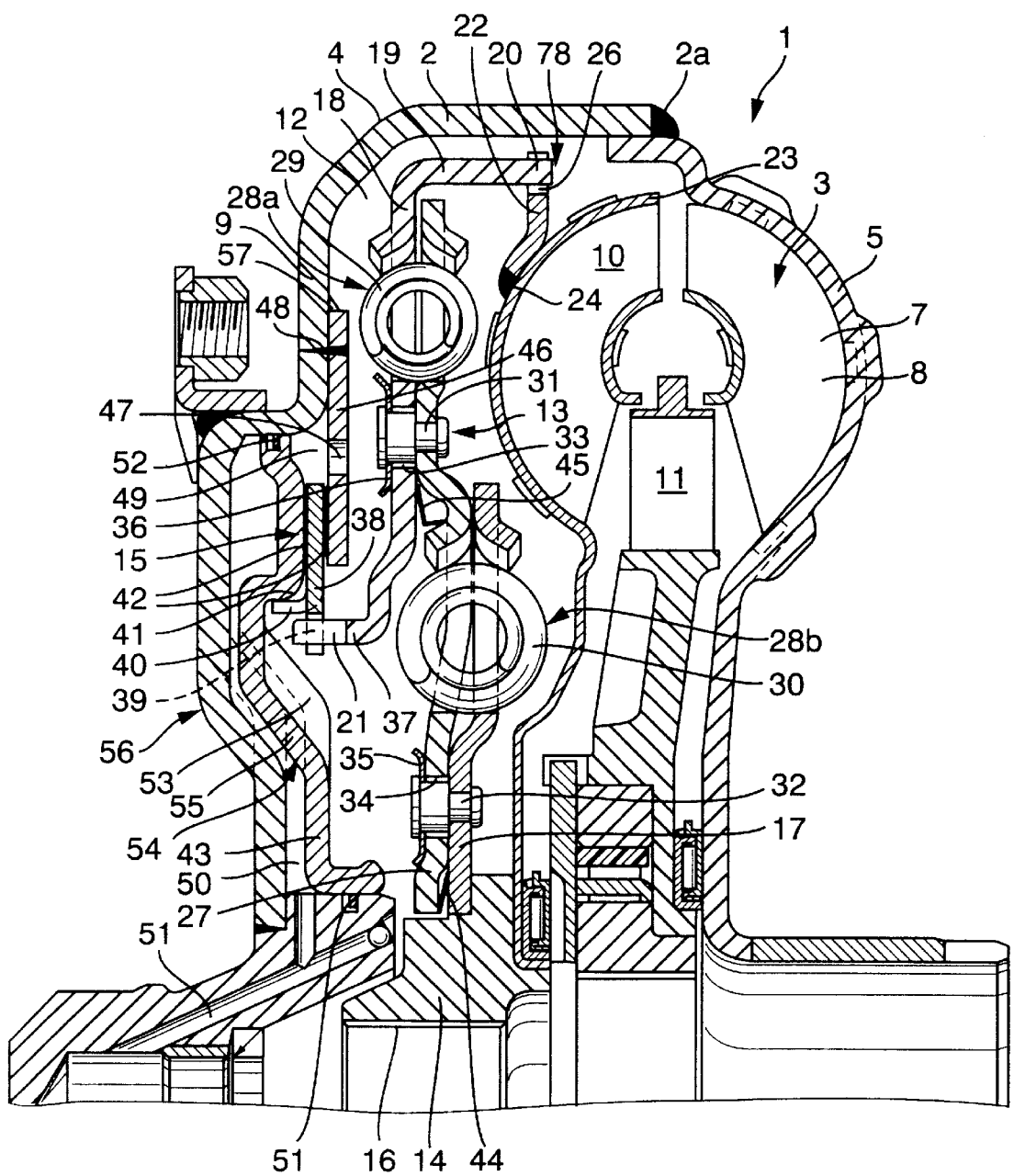
FIG. 1 is a fragmentary sectional view of a novel torque-transmitting apparatus with a two-stage damper.

The torque-transmitting apparatus 1 shown in FIG. 1 has a housing 2 confining a torque converter 3. The housing 2 is connected to a driving shaft that can constitute the output shaft of a prime mover such as, e.g., the crankshaft of a combustion engine. As is known, the housing 2 is constrained to rotate with the shaft by a sheet metal disk that is connected at an inner radius with the driving shaft and at an outer radius with the housing.

The housing 2 comprises a shell 4 adjoining the driving shaft or the combustion engine and a further shell 5 axially distant from the driving shaft and attached to the housing shell 4 by means of a weld 2a. The two housing shells 4 and 5 are connected and sealed at their radially outer portions by a welded connection 6. In the illustrated embodiment, the housing shell 5 simultaneously serves as the outer shell of the pump 7. This is accomplished by connecting the vane portions 8 to the housing shell 5 in a manner known manner per se. A turbine 10 is interposed axially between the pump 7 and the radially extending wall 9 of the housing shell 4. A stator 11 is provided between the radially interior portions of the pump 7 and the turbine 10.

Furthermore, the internal space 12 enclosed by the housing shells 4, 5 contains a torque-elastic damper 13 that establishes torque-elastic connection between the output hub 14 and a driving part. In the illustrated embodiment, the driving part is formed by the housing shell 4 in the case where the lockup clutch 15 is engaged or operates with slip. When the lockup clutch 15 is disengaged or slipping, the driving part is formed by the turbine 10. The converter lockup clutch 15 is arranged in series with the damper 13.

The hub 14 representing the rotary output element of the torque-transmitting apparatus 1 can be coupled through an interior toothed profile 16 to an input shaft (not shown) of a transmission. The turbine 10 is rotatable within a limited angular range relative to the rotary output element, i.e., the hub 14, against the opposition of the damper. In the case of a damper based on the principle of shear flow of a hydraulic medium, while the relative rotation between the turbine 10 and the output element 14 would still be damped, the angle of relative rotation would be unrestricted.

The output hub or rotary output element 14 is non-rotatably connected, e.g., welded or caulked, to the flange-like output member 17 of the torque-elastic damper 13. The input member 18 of the torque-elastic damper 13 is at its outer perimeter bent in the axial direction towards the turbine and forms an axially oriented flange-like part 19 with a rim of axially directed teeth 20. At its interior perimeter the input member 18 is bent in the axial direction towards the housing shell 4 and has a rim of axially directed teeth 21 so that the input member 18 transmits the torque flow through form-locking connections to the lockup clutch 13 and the turbine 10 by means of the toothed rims 20, 21. For this purpose, a radially oriented flange-like part 22 is attached to the turbine 10 by a weld 24 along its inner perimeter to the outside of the turbine shell 23. The flange-like part 22 along its outside perimeter has a toothed rim 26 and thereby forms an axial plug-in connection 78 to the input member 18 of the damper 13.

Input member 18 and output member 17 in the axial space between them enclose a flange-like intermediate part 27 which simultaneously constitutes the output member of the first damper stage 28a and the input member of the second damper stage 28b. Input member 18, output member 17 and intermediate part 27 are equipped in an essentially known manner with windows for holding the energy-storing devices in the form of coil springs 29, 30 for the two damper stages 28a, 28b.

In the axial direction, input member 18 is connected to an intermediate part 27, and the intermediate part 27 is connected to the output member 17 by means of fasteners, here in the form of rivets 31, 32. The given range of play by which the parts can rotate relative to each other is limited by the rivets passing through elongated perforations 33, 34 that are arranged along a circle on the input member 18 and on the intermediate part 27, forming stops limiting the extent of travel of the rivets within the holes. As axial retainers for the rivets 31, 32, ring-shaped membranes 35, 36 are provided on the side of the perforations 33, 34. The axial spacing of the input member 18 from the intermediate part 27 and of the intermediate part 27 from the output member 17 is provided by energy-storing devices working in the axial direction between the respective parts, represented in this embodiment by plate springs 44, 45.

The input member 18 at its interior perimeter has a profile shape designed to accommodate the energy-storing devices 30 so as to make optimum use of the available axial space, then turning into the axial direction to form an axially oriented flange-like part 37 with a rim of axially directed teeth 21, where the input member 18 meets the exterior toothed rim 39 of a friction-lining carrier 38 in a form-locking engagement. The friction-lining carrier 38 is centered on a shoulder 41 by means of lugs 40 bent into the axial direction towards the control piston 43 and is faced on both sides with friction linings 42 along its outer perimeter. The friction-lining carrier 38 is interposed in the axial direction between the control piston 43 and the annular disk 46. The latter is attached in a rotation-blocking connection to the housing shell 4, which in the respective area extends in the radial direction. Fastener means such as the impulse weld 48 of the present example are used for the connection. The annular disk 46 has cut-outs 47 distributed along a circle that serve to promote circulation and cooling of the chamber 49 that is formed between the annular disk 46, the control piston 43 and the friction-lining carrier 38. The annular disk is centered on the housing 2 by means of projections 57 arranged in a circle on the housing shell 4.

The axial displacement of the control piston 43 effects the slipping engagement, full engagement and disengagement of the lockup clutch 15. The control piston is actuated by the pressure differential in the chamber 50 that is located in the axial direction between the control piston 43 and the housing shell 4 and is supplied from a pressure pump (not shown) with a pressure medium entering through a channel 51 from the radially interior direction. To seal off the chamber 50, the control piston 43 is equipped along its inner and outer perimeter with sealing means 51a, 52. Also, in order to improve guidance and to prevent canting and thereby jamming of the control piston, the latter is bent into the axial direction at one perimeter, such as at the interior perimeter in the present embodiment. To avoid slippage at the sealing means of the piston 43, the latter has a form-locking engagement with the housing 2 through an axially oriented profile 54 which in the present embodiment consists of alternating ring segment-like recesses 53 and projections 55 that are distributed over the circumference and are engaged by the complementary-shaped profile 56 of the housing shell 4.

The embodiment of FIG. 1 illustrates the function of the torque-transmitting apparatus 1 as follows: When the lockup clutch is open, the torque is transmitted by the pump 7 driving the turbine 10, assisted in known manner by the free-wheeling stator 11, through the converter medium that fills the interior space 12 to the flange-like part 22 from where the torque is introduced through an axial plug-in connection formed by the engagement of toothed rims 20, 26 into the input member 19 of the damper 13. When the lockup clutch 15 is closed, the torque-flow path runs through the form-locking engagement of the mutually complementary profiles 54, 56 as well as through the annular disk 46 that is connected to the housing 2. Through the friction engagement of the control piston 43 and the annular disk 46 with the friction linings 42, the torque is introduced into the friction-lining carrier 38 which, by means of the axial plug-in connection with toothed rims 21, 40, transmits the torque to the input member 18. Continuing from the input member 18, the torque flow is smoothed in the damper 13 by means of energy-storing devices 29, 30. The angular displacement of both damper stages 28a, 28b is bounded by limit stops 33, 34 and matched to the characteristics and properties of the energy-storing devices 29, 30. If a friction component is needed in the damper 13, i.e., in the damper stages 28a, 28b, the energy-storing devices 44, 45 are designed independently of each other in such a manner that a frictional engagement occurs for the first damper stage 28a between the securing membranes 35, 36 and the input member 17 and/or for the second damper stage 28b between the securing membranes 35, 36 and the intermediate part 27. The output member 17 of the damper 13 transmits the torque to the hub 14 representing the rotary output element of the torque-transmitting apparatus 1, from where the torque is introduced into the transmission shaft.

Figure 2:
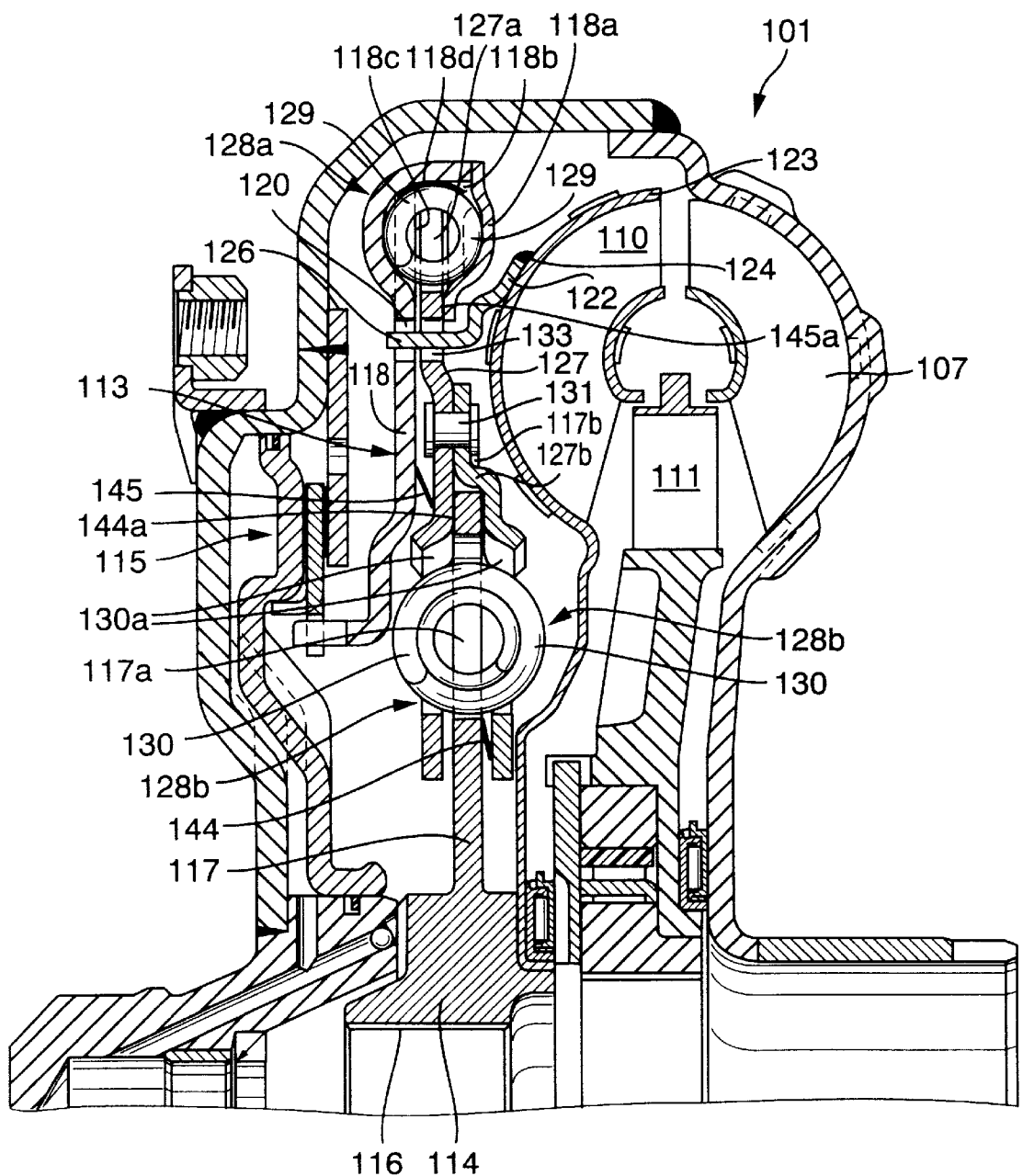
FIG. 2 is a fragmentary sectional view of a further embodiment of a torque-transmitting apparatus with an axial plugin connection located at a radial position between the energy-storing devices of two damper stages.

FIG. 2 shows an inventive torque-transmitting apparatus 101 of similar configuration as the torque-transmitting apparatus 1, but with a modified damper 113. The pump 107, stator 111, turbine 110, the overall construction, function and arrangement of the lockup clutch 115 are provided in similar manner as has been described in connection with FIG. 1.

The axial plug-in connection 178 in this embodiment is formed by the flange-like part 122, which is engaged without play in recesses 120 that are distributed over the circumference of the input member 118. At its interior perimeter, the flange-like part 122 is connected to the shell 123 of the turbine 10—by a weld 124 in the illustrated example. Subsequently, the flange-like part 122 conforms to the shape of the turbine shell at a radial distance, then turns into the axial direction towards damper 113, where its rim of axially oriented teeth 126 engages the openings 120 of the input member 118. The toothed engagement occurs at a radius inside the first damper stage 128a and outside the second damper stage 128b where the flange-like part 122 runs in the axial direction and passes through elongated perforations 133 formed along a circle on the intermediate part 117 that is provided as output member of the first damper stage 128a. Simultaneously, the flange-like part 122 forms the limiting stops for the relative angular displacement between the input member 118 and the intermediate part 117 within the angular range that is delimited by the perforations 133. Thus, the energy-storing devices 129 are bypassed in the case of large angular displacements and are protected against the possibility of harmful effects from high transient peaks in the torque flow. In this embodiment, the energy-storing devices of the first, radially exterior damper stage 128a are formed in a known manner as arc-shaped springs 129 that are accommodated and retained at their outside radius by a chamber 118b formed by the peripheral portion of the input member 118 that is bent into the axial direction towards the turbine 110 and by an additional lateral part 118a enclosing the arc-shaped springs on the side facing the turbine 110. The chamber 118b has provisions for applying a force in the longitudinal direction of the springs in the shape of protrusions 118c of the input member 118 and the lateral part 118a, and wear-protection shells may be interposed between the inside wall at the circumference of the chamber 118b and the arc-shaped springs 129. The intermediate part 127 representing the output member of the first damper stage 128a is arranged between the input member 118 and the lateral part 118a (relative to the axial direction) and is equipped with radially arranged extremities 127a along its outside perimeter. A further radially extending flange-like part 127b is connected to the intermediate part 127 through fasteners such as the rivets 131 shown in the present embodiment. With openings 130a formed in a known manner, the flange-like part together with the intermediate part 127 holds the energy-storing devices of the second damper stage 128b, in this embodiment represented by short, stiff helix springs 130 distributed evenly along a circle. On the output side, the force introduction into the springs is accomplished with the output member 117 that is interposed in the axial direction between the intermediate part 127 and the flange-like part 127b with openings 117a corresponding to the dimensions of the helix springs 130 that in the present embodiment consist of sets of helix springs nested inside each other. At its outer perimeter, the output member 117 has extremities 117b that are directed outwards in the radial direction and engage openings 127c in the flange-like part 127b with play, thus allowing the intended range of angular displacement for the second damper stage 128b and providing limit stops so that the second damper stage 128b will be bypassed when the angular displacement of the extremities 117b within the openings 127c has reached the limit.

By the interposition of energy-storing devices—in this case plate springs 144, 145—the respective input and output members 118, 127 of the first damper stage 128a and 127, 117 of the second damper stage 128b are spaced apart from each other, and through appropriate selection of the spring constants of the plate springs 144, 145, it is possible to achieve a desired amount of frictional torque at the friction surfaces 144a, 145a.

In the present embodiment, the output member 117 and the output element 114 with the interior toothed profile 116 for the torque-transmitting connection to the transmission shaft (not shown) are formed as one integral part.

Figure 3:
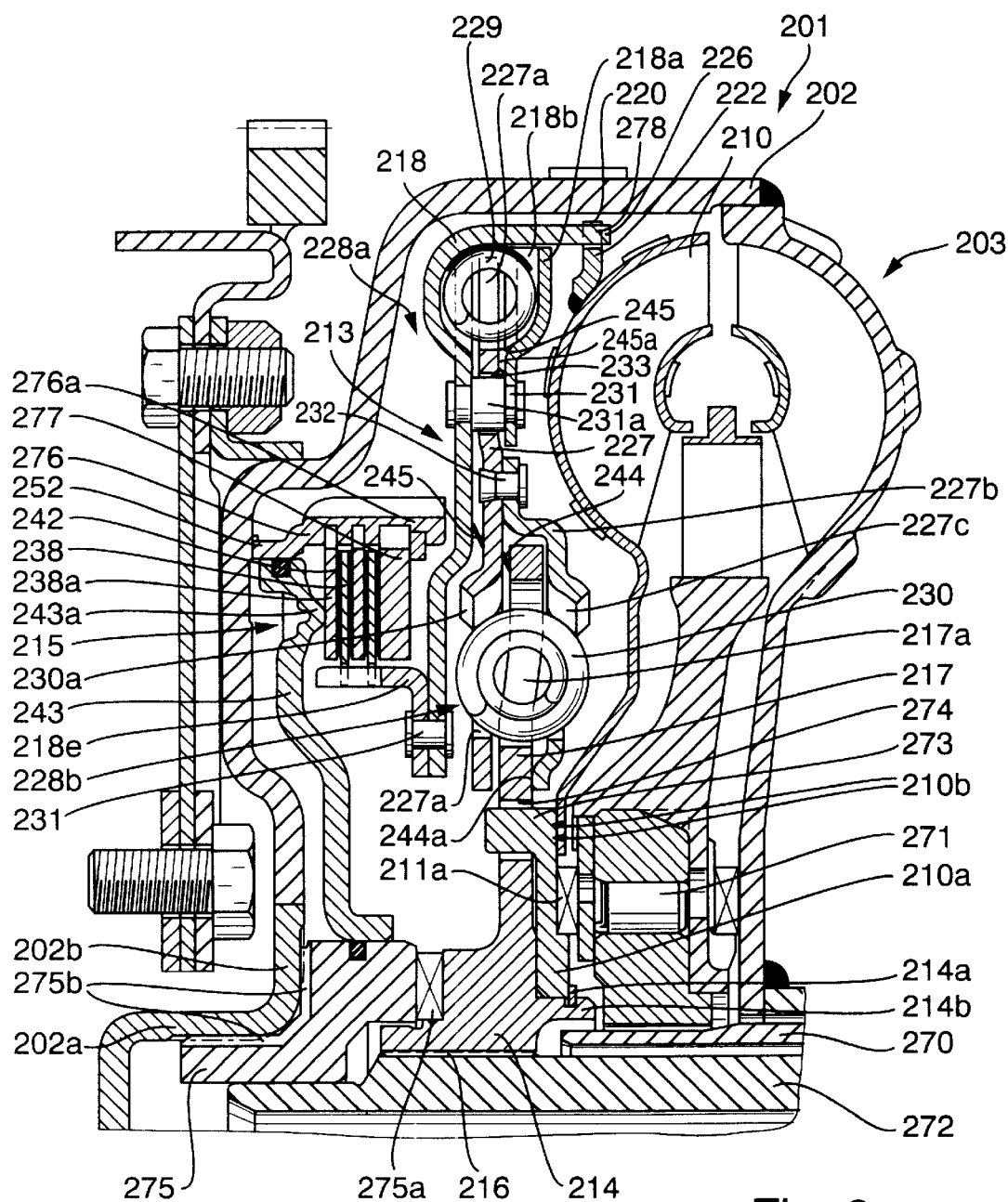
FIG. 3 is a fragmentary sectional view of an embodiment of the invention with axially directed projections formed on the hub.

FIG. 3 illustrates an embodiment of a similar torque-transmitting apparatus 201 similar to the torque-transmitting apparatuses 1 and 101 with a housing 202 that also contains a torque converter 203. The pump 208 and the stator 211 are configured and arranged in the same manner as has been described in the context of FIG. 1.

The turbine 210 is spaced apart from the stator 211 by means of a roller bearing 211a and is connected to a hub 210a by means of a weld 210b made, e.g., by impulse welding. The hub 210a is centered on a projection 214b of the hub 214 extending axially towards the stator 211. The hub 214 represents the output element of the torque-transmitting apparatus 201 and has an interior toothed profile 216 for a form-locking engagement with the outward-facing profile of a transmission shaft 272. For optimum use of space in the axial dimension, the projection 214b surrounds the outside of the stationary sleeve 270 that supports the stator 211 through a free-wheeling hub 271. In the axial direction, the hub 210a is held in place on the projection 214b by a retaining ring 214a. To limit the relative angular displacement between the turbine 210 and the hub 214, i.e., the working range of the damper 213, the hub 210a has axially directed bolts 273 engaged with the required amount of rotational play in openings 274 of the hub 214, the latter representing at the same time the output member 217 of the damper 213.

To accommodate the control piston 243 of the lockup clutch 215, a further hub 275 is slidably supported on the transmission shaft and rotatable relative to the hub 214 by means of a roller bearing 275a retaining the hub 275 engaged with the housing 202. In first axially and then radially outwards directed wall portions 202a, 202b of the housing 202, axial and radial toothed profiles are, respectively, arranged for a form-locking engagement with complementary toothed profiles 275b on the hub 275. On the axially extending circumference of the hub 275, a seal 251 is provided for sealing the piston 243.

Located at a farther radius, the piston 243 has ridges 243a running in a circle and projecting axially towards the friction-lining carriers 238. When the piston 243 is displaced in the axial direction, the ridges 243a bear against the clutch disks 238a and the friction-lining carriers 238 that are faced on both sides with friction linings 242, resulting in slipping engagement, full engagement, and disengagement of the lockup clutch 215. The axial displacement of the piston 243 is energized by the application of pressure differentials of a pressure medium entering through a channel (not shown) into the tightly sealed chamber 250 that is formed by the piston 243a where the sealing interface between the outer circumference of the piston 243 and the housing 204 is formed by a seal 252.

The clutch disks 238a and an additional annular disk 277 that serves as take-up surface against the clutch force are at their exterior circumference engaged by a rotation-blocking toothed profile and secured axially by a retaining ring 276a in the exterior disk holder 276 that is welded to the housing 204. The friction-lining carriers 238 are held at their inside perimeter in the interior disk holder 218e by a rotation-blocking tooth profile. Consequently, when there is friction engagement between the clutch disks 238a and the friction linings 242, a torque-locked connection is established between the housing 202 and the interior disk holder 218e, whereby the latter imparts the applied torque to the input member 218. For this purpose, the inner disk holder is shaped as a ring of approximately rectangular cross-sectional profile. The portion of the disk holder that is running in the axial direction towards the housing 204 supports the friction-lining carriers 238, while the second portion, extending outwards in the radial direction, is attached to a radially directed portion of the input member 218 in a non-rotatable connection by means of fasteners such as the rivets 231 that are arranged along a circle in the illustrated example.

As has been described, the input member 218 of the damper 213 takes up the applied torque in the case where the lockup clutch 215 is closed or at least partially engaged. When the lockup clutch 215 is open as well and when it is slipping, the torque (or a portion of the torque when the lockup clutch 215 is slipping) is passed on from the turbine 210 through an axial plug-in connection 278 to the input member 218 in the same manner as was described in the context of FIG. 1, but using the arrangement and functional concept of FIG. 2, where the input member 218 together with the lateral part 218a forms a chamber 218b to accommodate the arc-shaped springs 229 with the wear-protection shells 218d inserted at the contact surfaces. In order to form the axial plug-in connection 278, the axially directed portion of the input member 218 is extended at the outer circumference towards the turbine in such a manner that its axially directed toothed rim 226 can engage the outward-pointing toothed rim 220 of the radially directed flange-like part 222 that is attached to the turbine.

Input member 218 and lateral part 218a are connected by means of fasteners represented in the present embodiment by the rivets 231 with spacer bolts 231a to hold them at a fixed distance from each other. Arranged in the space extending in the axial direction between input member 218 and lateral part 218a is the intermediate part 227 in the shape of a disk-shaped part 227 serving as output member of the first damper stage 228a and as input member of the second damper stage 228b. The detail configuration of the disk-shaped part 227 is illustrated in a partial view in FIG. 4.

Figure 4:
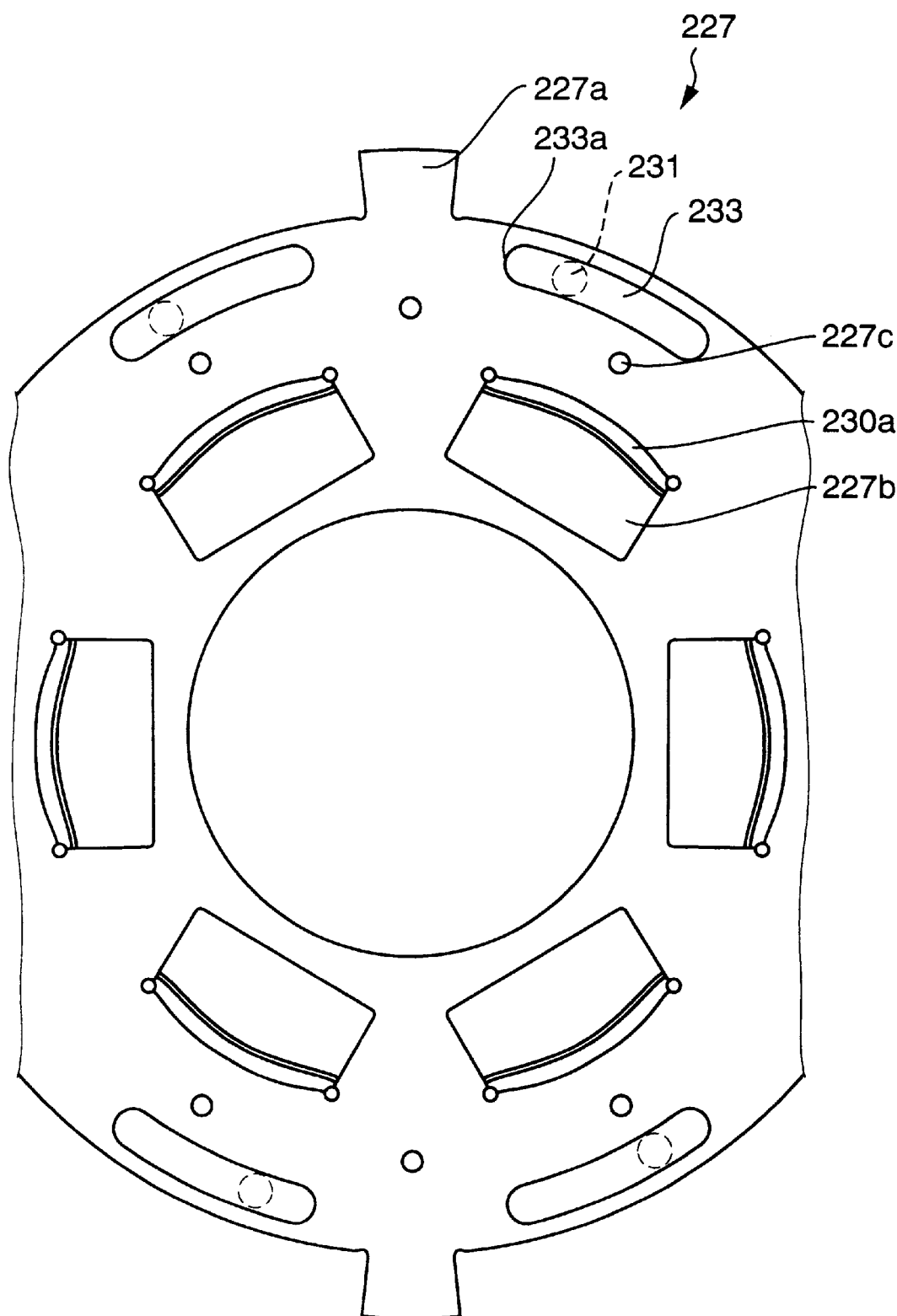
FIG. 4 is a partial view of a disk-shaped part of a damper.

The FIGS. 3 and 4 show a disk-shaped part 227 with radially directed extremities 227a arranged at the exterior circumference and serving as force-introduction elements for the arc-shaped springs (FIG. 3). Distributed along a circle of smaller radius in the disk-shaped part are elongated openings 233 through which the rivets 231 pass, permitting relative rotation between the input member and the output member of the first damper stage 228a within a limited angular range. As soon as the rivets 231 reach the borders of the cutouts 233, the first damper stage 228a is bypassed and the applied torque is transmitted through the contact points between the rivets 231 and the cutouts 233, whereby the arc-shaped springs are protected against greater amounts of torque and angular displacement. The rest position of the rivets 231 in the illustrated embodiment is not centered within the cutouts 233 (seen in the circumferential direction), meaning that the range of angular displacement is not equal in both directions but is smaller in the "push" direction than in the "pull" direction. In an inventive embodiment not shown in the drawing, the rivets 231 can be in direct contact with the border 233a of the elongated openings 233 so that this damper stage is being bypassed immediately in the push direction without an angular displacement, thus providing a damper with one active stage in the push direction and two active stages in the pull direction. Distributed over another yet smaller circle in the disk-shaped part are further openings 227b to hold the energy-storing devices in the form of short helix springs 230 nested inside each other (FIG. 3). At their outer radius, the openings 227b have flaps 230a that are bent towards the lockup clutch 215 to secure the helix springs 230 in the axial direction. By means of the rivets 232 passing through holes 227c (FIG. 4) distributed along a circle of intermediate radius between the openings 233, 227b, the disk-shaped part 227 is connected to a further flange-like part (227b) that has openings with flaps (227c) bent axially towards the turbine to accommodate the helix springs 230. The flange-like part (227c) is formed into the shape of a cup extending in the axial direction to provide space in the axial dimension between the intermediate part 227 and the flange-like part (227b) to accommodate the hub 214. The hub 214 is extended radially into a disk shape to serve as output member 217 of the damper 213 and thus of the second damper stage 228b. To provide space for and couple a force to the helix spring 230, the output member 217 has openings 217a distributed along a circle so that the hub 217 is rotatable relative to the intermediate part 227 against the restoring force of the helix springs 230. This produces the damping effect of the second damper stage 228b wherein the range of angular displacement is limited by the play of the bolts 273 in the openings 274.

The input member 218 and the output member 227 of the first damper stage 228a as well as the input member 227 and the output member 217 of the second damper stage 228b are elastically clamped against each other by the action of the interposed plate springs 244, 245. Thus, with an appropriate selection of the spring characteristic, a friction effect of a desired magnitude can be generated between the respective input and output members 218, 227 and 227, 217 at the friction surfaces 244a, 245a, where the friction surface 245a is provided by a series of projections distributed along a circle on the lateral part 218a.

Figures 5, 6:
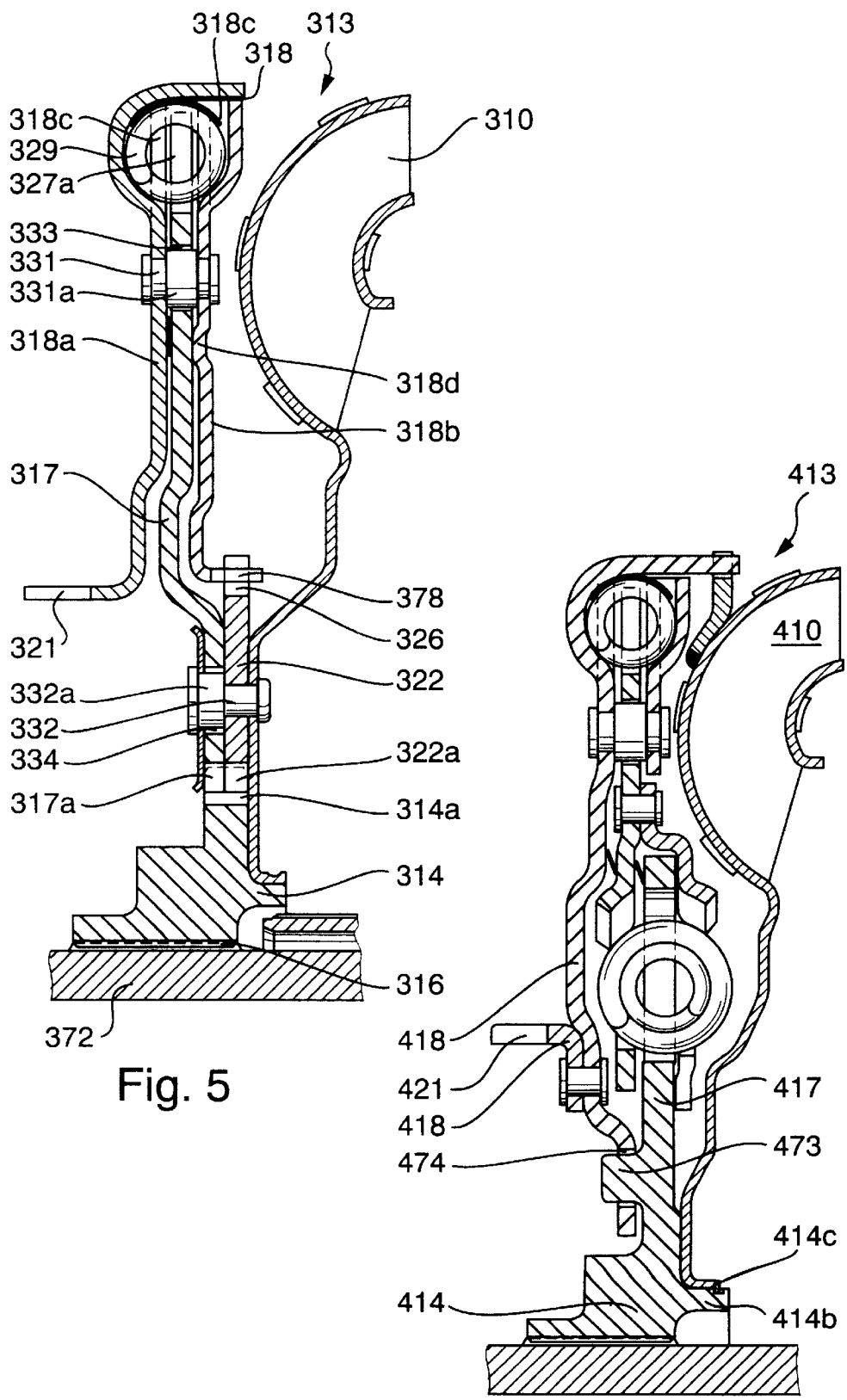
FIG. 5 is a fragmentary sectional view of an embodiment of a damper.
FIG. 6 represents a fragmentary view of another embodiment of a damper.

FIG. 5 illustrates an embodiment of a damper 313 in single-stage configuration. The torque to be transmitted is introduced into the damper 313 through the two lateral parts 318a, 318b that form the input member 318. The contributions to the torque coming from the lockup clutch 315 are introduced into the damper 313 through the toothed rim 321 of the lateral part 318a of the input member 318. The contributions to the torque coming from the turbine 310 are introduced through the inventive plug-in connection 378 into the input member 318, represented by its lateral part 318b. In addition, a disk-shaped part 322 is connected by means of rivets 332 with the turbine 310, with the hub 314 (that represents the output element and is connected to the transmission shaft 372 through a toothed profile 316) and with the output member 317. The spacer bolts 332a are provided to allow an angular displacement of the output member 317 relative to the turbine 310, hub 314 and lateral part 322 within a range that is delimited by the borders of elongated openings 334. The disk-shaped part 322 is engaged in a toothed exterior profile 314a of the hub 314 without play. At its outer circumference, the disk-shaped part 322 has an exterior toothed rim 326 that forms the play-free plug-in connection 378. Also engaged in the toothed exterior profile 314a of the hub 314 is the output member 317 of the damper 313, which has a toothed inner perimeter 317a with an amount of play between the opposing tooth flanks that determines the range of relative angular displacement between the input member and the output member in opposition to the restoring torque of the energy-storing devices 329. It should be noted, however, that the openings 334 and the elongated further openings 333 that are located farther out in the radial direction on the output member 317 will permit a larger amount of angular displacement. Nevertheless, it is conceivable in principle that the maximum amount of angular displacement is determined by any one of the three elements 317a, 333, 334.

The energy-storing devices 329 have the shape of arc-shaped springs 329. The configuration of the chamber 318c that accommodates the arc-shaped springs 329 as well as the arrangement and function of the force-introducing elements have been described previously in the context of FIGS. 2 and 3.

The lateral parts 318a, 318b are connected in the axial direction by means of rivets 331 and spacer bolts 331a and are held at a suitable distance from each other to allow the output member 317 to be arranged within the axial space between them. Interposed between the lateral part 318a and the output member 317 is a plate spring whose axial thrust determines the intensity of the frictional engagement between the output member 317 and a circular ridge 318d formed on the lateral part 318b.

FIG. 6 illustrates a further embodiment of a two-stage damper 413 of the kind that was described in the context of FIG. 3, except for the following distinguishing features: The turbine 410 is supported in a manner permitting relative rotation directly by the hub 414 that forms the output element; it is centered on a shoulder 414b provided for this purpose and secured in the axial direction by a retaining ring. Thus the hub 210a shown in FIG. 3 can be omitted. The bolts 473 delimiting the maximum angular displacement between output member 417 and output member 418 are distributed along a circle and configured to protrude directly from the hub 414 into the axial direction, engaging the input member 418 through elongated openings 474 that provide the limiting stops. For the form-locking engagement with the lockup clutch (not shown), a ring 418e of rectangular profile is attached to the input member 418 by means of rivets (231) that are arranged along a circle. The radially directed portion of the ring 418e is riveted to the input member 418, while the axially directed portion provides the form-locking engagement with the lockup clutch by means of an axially directed profile.

Figure 7:
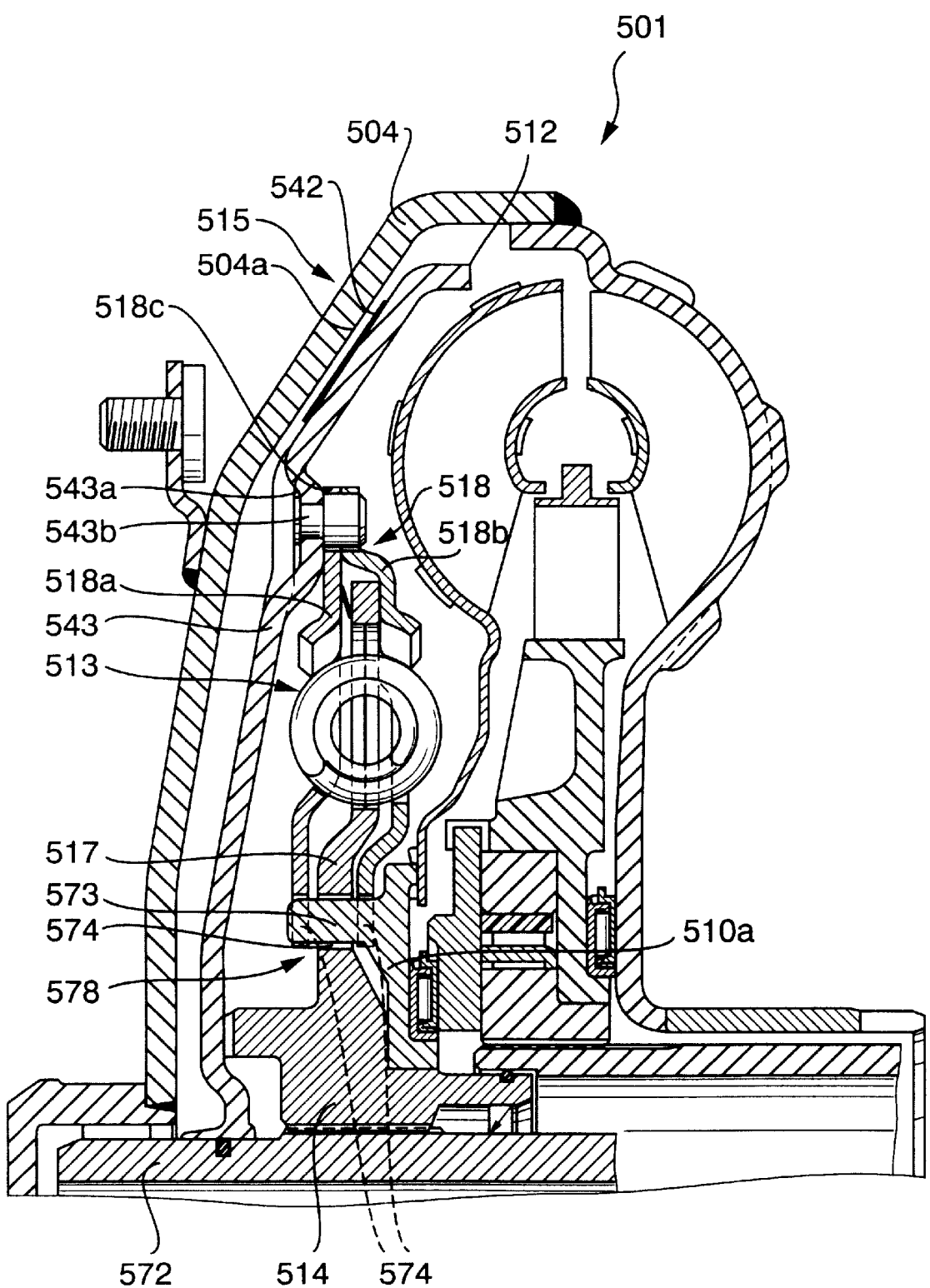
FIG. 7 is a fragmentary axial sectional view of an embodiment of a torque-transmitting apparatus with a single-stage damper.

FIG. 7 illustrates a further inventive embodiment of a torque-transmitting apparatus 501 with a single-stage damper 513 and a modified lockup clutch 515.

The control piston 543 of the lockup clutch 515, which is axially displaceable, sealed and centered on the transmission shaft 572, carries a friction lining 542 along its radially exterior peripheral area on the side that is facing the friction surface 504a on the housing 504. When the clutch is closed or slipping, the friction lining 542 is frictionally engaged with the friction surface 504a of the housing 504 and thereby introduces the torque to the input member 518 consisting of lateral parts 518a and 518b.

At a point between the housing 504 and the piston 543, converter fluid is suctioned off through an outlet channel (not shown), whereby an under pressure is generated relative to the converter chamber 512, resulting in an axial displacement of the piston 543, thus providing the capability of controlling the slipping engagement, closing and opening of the lockup clutch 515. The friction engagement between the friction surface 504a and the friction linings 542 can be controlled so that the lockup clutch 515 slips while the friction linings 542 are being cooled by the passing flow of the converter medium. However, it is also possible to engage the lockup clutch without slippage. The friction surface 504a and the control piston 543 are cone-shaped in the vicinity of the friction engagement, so that the closure and friction engagement of the lockup clutch are enhanced by the effect of the centrifugal force.

In a circular area of smaller radius than the friction linings 542, the piston 543 has protuberances 543a projecting in the axial direction towards the input member 518 where the piston 543 is connected to the lateral parts 518a and 518b by means of bolts 543b in a manner permitting axial but blocking rotational movement of the piston in relation to the input member 518. The two lateral parts 518a, 518b are riveted together at their outer circumference (rivets not shown), while the bolts 543b are inserted into cutouts 518c on the lateral parts 518a, 518b that are open at the outer perimeter and thereby permit an axial play between the piston 543 and the input member 518. The purpose is to prevent negative effects on the axial mobility of the piston 543 from stresses that occur during the engagement and disengagement of the lockup clutch between the piston 543 and the already torque-loaded input member 518.

The torque introduction through the turbine 510 occurs by means of a turbine hub 510a that is centered on the hub 514 representing the output element. The turbine hub 510a is fixedly attached to the turbine 510 and has axially directed projections 573 distributed along its outer perimeter that are engaged without play—in order to avoid a one-sided introduction of torque—in openings of both lateral parts 518a, 518, thereby forming the inventive plug-in connection 578 between the turbine 510 and the input member 518.

The disk-shaped output member 517 that is formed out of the hub 514, together with the input member 518 and the energy-storing devices in the form of nested helix springs 530, represent an essentially known damper device 513. A series of openings (574) is distributed along a circle on the output member 517. The projections 573 of the turbine hub 510a pass through the openings (574) and stop the relative angular displacement between the input and output members 518, 517 against the restoring torque of the energy-storing devices 530 as soon as the projections 573 run against the borders of the openings (574).

Figure 8:
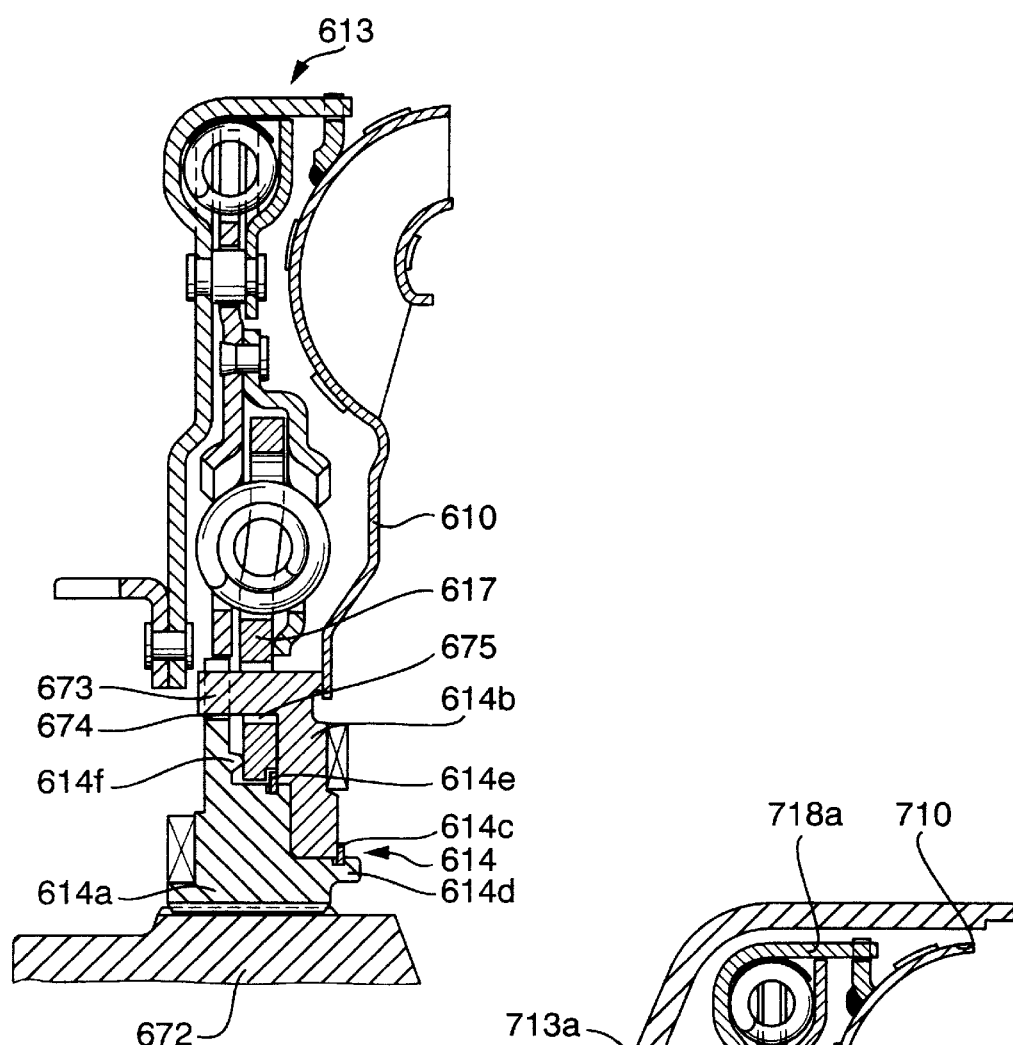
FIG. 8 is a fragmentary axial sectional view of an embodiment of a torque-transmitting apparatus with a two-stage damper and a two-part hub.

FIG. 8 illustrates a further possible configuration of a damper device 613 of the inventive torque-transmitting apparatus. In contrast to the damper devices described above, the hub 614 is composed of two hub components 614a, 614b. The hub component 614a is mounted on the transmission shaft 672 in play-free and rotation-blocking connection. The hub component 614b is supported and aligned on a shoulder 614d arranged axially on the hub component 614a on the side towards the transmission. The hub component 614b is secured axially by means of a retaining ring 614c. The turbine 610 is firmly connected with the hub component 614b, e.g., by welding or keying. To form a meshing engagement with play between the first and second hub components 614a, 614b, the second hub component 614b has axially directed projections 673 distributed along its circumference, which engage openings 674 of the hub component 614a. The dimension of the openings 674 in the circumferential direction is such that the projections 673 in concert with the openings 674 permit a desired amount of relative angular displacement between the turbine 610 and the hub component 614a, with the damper 613 being interposed between them. The output member 617 of the damper device 613 is arranged axially between the two hub components 614a, 614b, centered on the hub component 614a and rotationally tied to it by means of the keyed connection 614e. The output member 617 rests against the hub component 614a along a series of projections distributed on a circle or a circular ridge 614f protruding in the axial direction. At locations that correspond to the openings 674, the flange-like output member 617 of the damper device 613 has openings 675 that are engaged by the projections 673 of the hub component 614b. It is advantageous if the openings 675 are wider in the circumferential direction than the openings 674, so that the limits of angular play are determined by the openings 674. This prevents the torque from entering the hub component 614a through the keyed connection 614e, so that the latter does not have to be dimensioned for the torque loads that would occur in that case. The function of the further components of the damper device 613 is otherwise comparable with the other damper devices that have been described above.

The FIGS. 9–12 show partial sectional views of embodiments of dampers 713a–d that are similar to the damper 213 of FIG. 3. The dampers 713a–d differ from the damper 213 and in part among each other in the different configuration of the input member 718a–d and the output member 717.

In contrast to the hub 214 and the output member 217 being configured together as one piece as in FIG. 3, the dampers 713a–d of FIGS. 9–12 have output members 717 and hubs 714 in two-piece configuration, in which the output members 717 are sheet metal stampings attached to and centered on the hub 714 in a rotation-blocking connection, e.g., by shrink-fitting. To accommodate the energy-storing devices of the second damper stage, the disk-shaped output members 717 have window-shaped openings 717a distributed along a circle. The disk-shaped output members 717 limit the angular displacement of the second damper stage by means of radially directed extremities 717b distributed along the circumference, which are engaged with the required amount of angular play in corresponding openings of the disk-shaped part 727b that serves as input member of the second damper stage.

Figure 9:
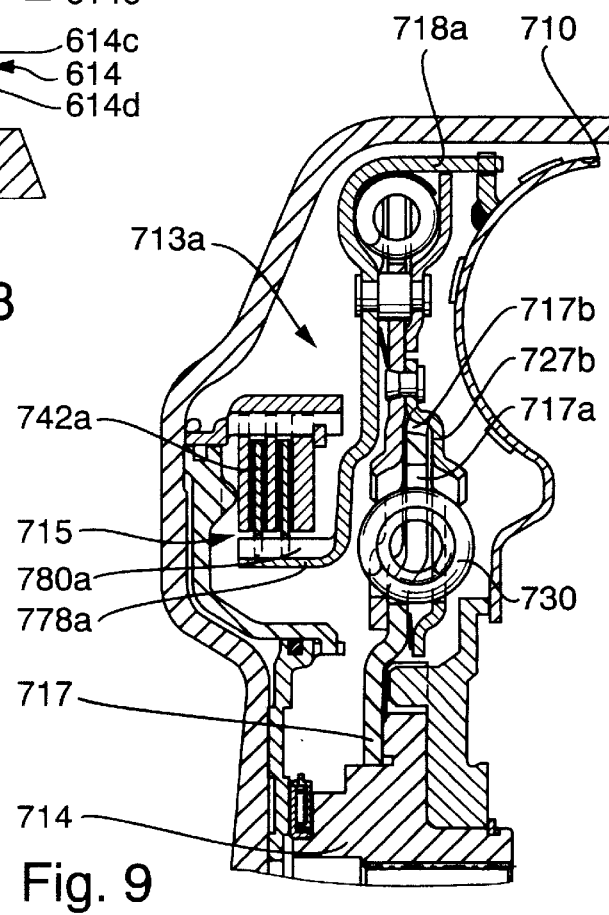
FIGS. 9–12 are fragmentary sectional views of further embodiments of two-part turbine dampers.
Figure 11:
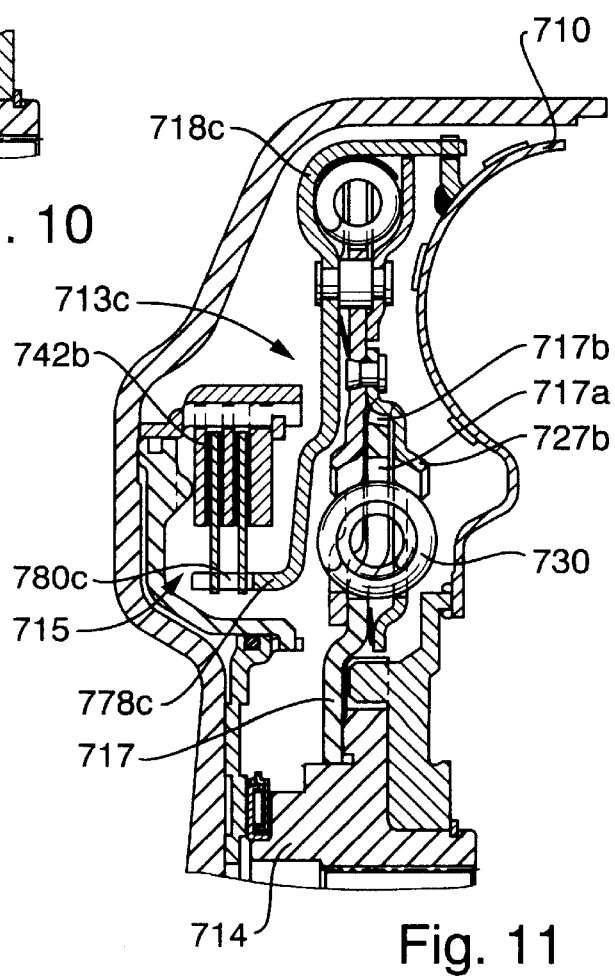

In the dampers 713a, 713c of the FIGS. 9 and 11, respectively, the input members 718a, 718c of the damper that transmit an applied torque from the converter lockup clutch 715 and/or from the turbine 710 to the damper 713a, 713c are of single-piece configuration, i.e., they have at their inner circumference an axially directed extension 778a, 778c with a hprofile 780a, 780b for a rotation-blocking engagement of the disks 742a, 742b. The profile 780a (FIG. 9) is impressed into the exterior circumference of the extension 778a, while the profile 780c (FIG. 11) is formed by axially oriented openings distributed over the circumference of the extension 778c for a rotation-blocking engagement of the correspondingly profiled disks 742b.

Figure 10:
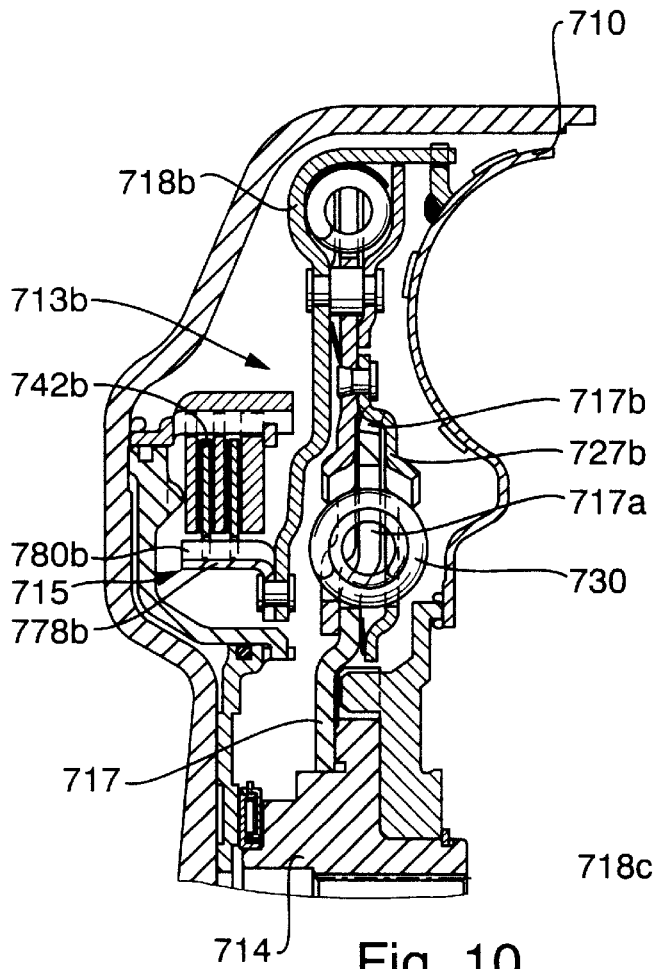
Figure 12:
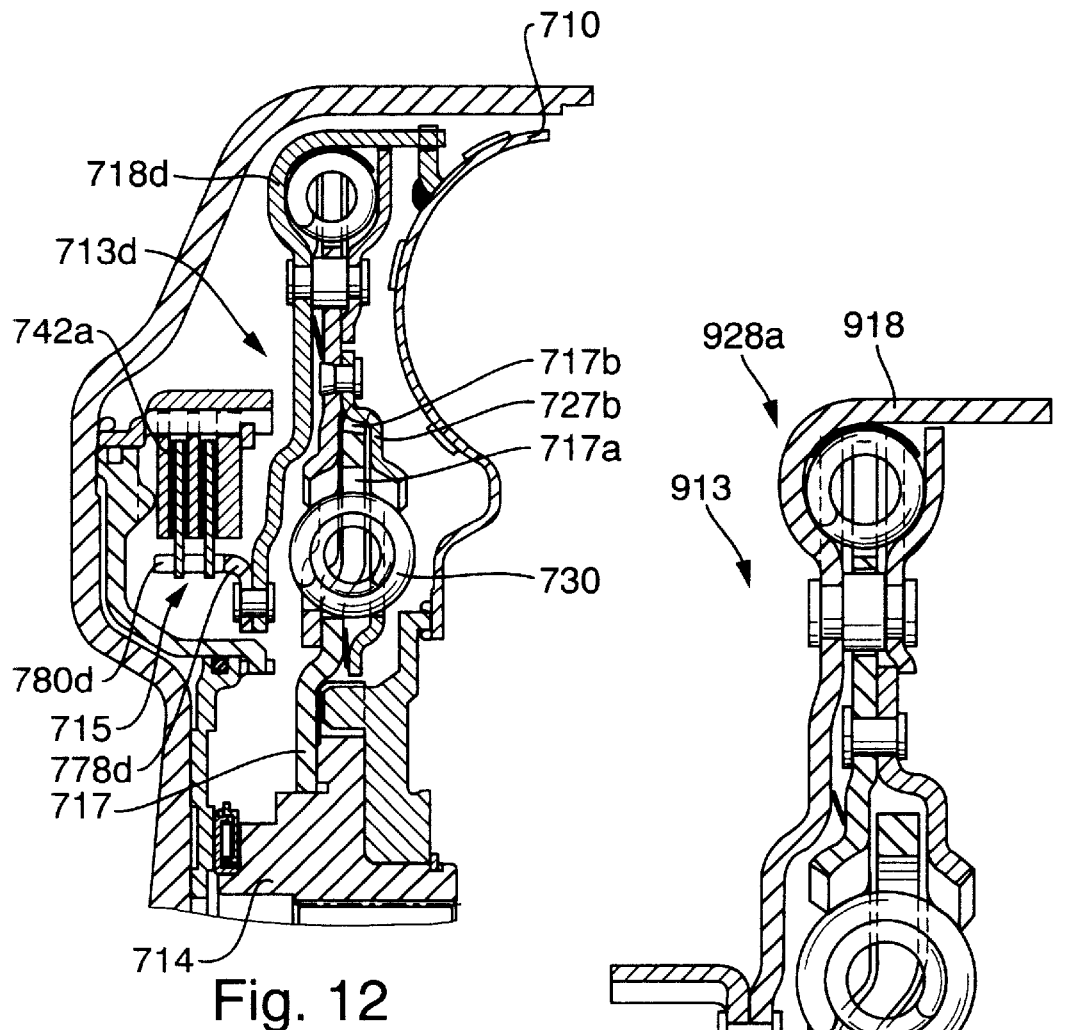

The dampers 713b, 713d of FIGS. 10, 12 have an input member 718b, 718d firmly connected, preferably riveted as shown here, to the flange-like part 778b, 778d of L-shaped crosssection. The flange-like parts 778b, 778d have profiles 780b, 780d corresponding to the extensions 778a, 778c of FIGS. 9, 11 for a rotation-blocking connection with the disks 742a, 742b of the converter lockup clutch 715.

Figures 13, 15:
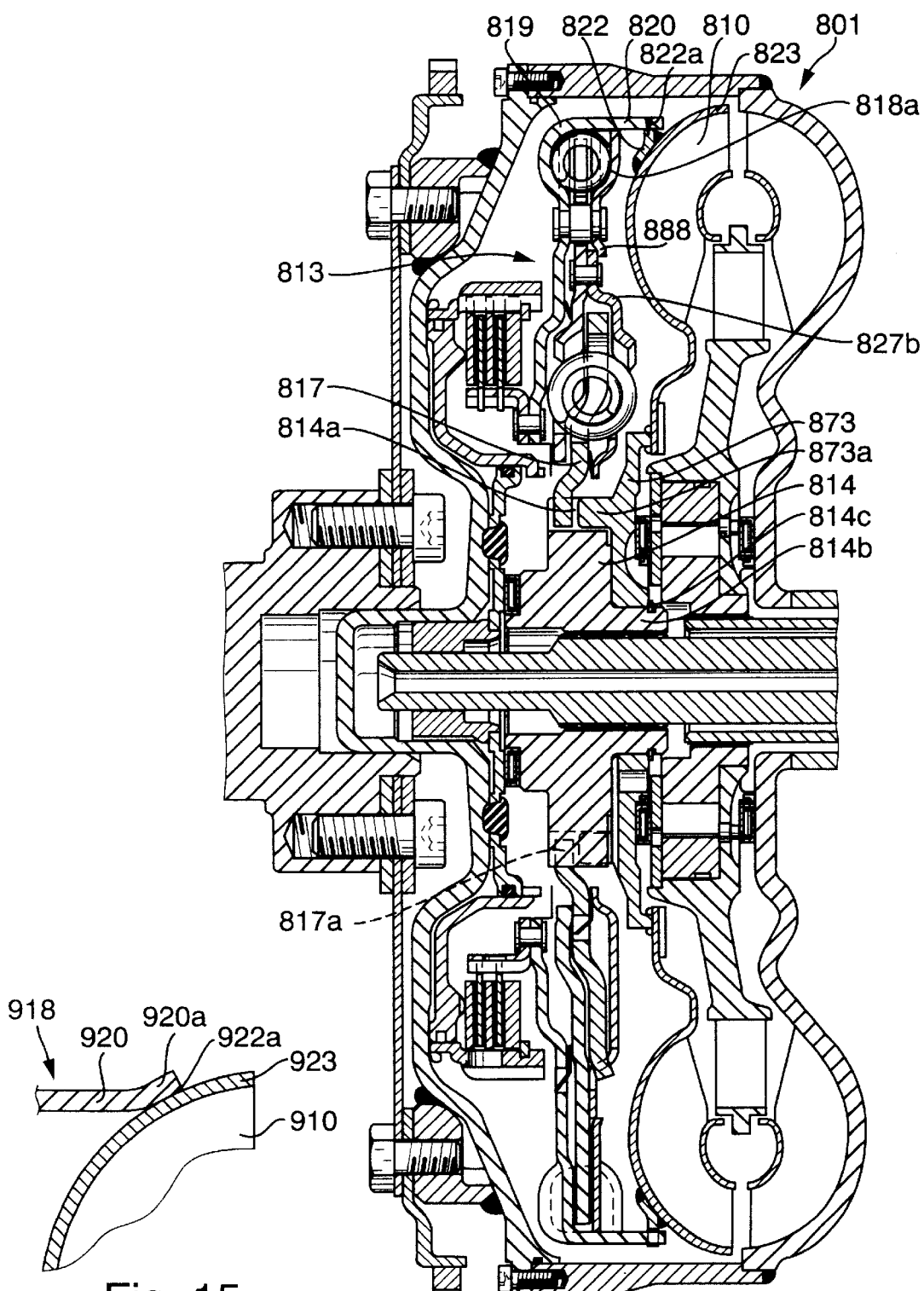
FIG. 13 represents an embodiment with a damper docked fixedly to the turbine shell.
FIG. 15 represents a detail of an embodiment comprising a damper that is docked fixedly to the turbine shell.

FIG. 13 represents a cross-sectional view of an embodiment of a torque-transmitting apparatus 801. Its damper 813, shown here in a two-stage configuration working in serial mode, is at its outer perimeter solidly connected and thereby axially constrained to the turbine 810. At its inner perimeter, the damper 813 has an axially displaceable but non-rotatable connection to the hub 814.

The damper 813 is attached to the turbine shell 823 by means of a weld seam or spot welds 822a using essentially known welding methods such as, e.g., induction welding, laser welding, impulse welding, or other suitable welding methods. It is to be understood that any other fastening method such as riveting, as well as self-locking connections, could also be used advantageously. In the illustrated embodiment, a connector flange 822—or alternatively an arrangement of connector lugs in the shape of circular segments distributed over a circumference—is attached, e.g., welded, to the turbine shell 823. The axially directed extension 820 of the input member 819 is slipped over the connector flange 822 or the connector lugs and then attached as described above. It can be advantageous if in the attachment process the connector flange 822 is centered on the turbine and the input member 819 is centered on the connector flange.

Additionally or alternatively, it can be of advantage if the second damper stage is centered on the first damper stage in order to prevent displacement of the two damper stages relative to each other. Thus it is possible to accomplish the centering through a configuration in the area 888 where a component 818a of the input member of the first damper stage overlaps radially with a component 827b of the output member of the first damper stage (which is also the input member of the second damper stage), allowing the two damper stages to be positioned relative to each other.

The output member 817 of the damper 813 is connected to the hub 814 through an inward-facing toothed profile that engages an exterior toothed profile of the hub 814, allowing axial but preventing angular relative displacement, so that stresses between the outer attachment 822a and the interior connection of the damper 813 are prevented.

The turbine 810 is supported through a turbine hub 873 on an axially projecting shoulder 814b of the hub 814. The turbine hub 873 has limited rotational play relative to the hub 14 and is axially secured by a retaining ring 814c. The angular displacement of the turbine 810 relative to the hub 814, i.e., the working range of the damper 813, is limited by axially directed projections 873a distributed along a circle on the turbine hub 873 that are engaged with angular play in the exterior toothed profile 814a of the hub 814. It is to be understood that the toothed interior rim 817a of the output member 817 and the projections 873a of the turbine hub 873 do not have to be arranged side by side as shown in FIG. 13 but may instead be one above the other for the benefit of minimizing the overall axial dimensions, in which case it is advantageous if the projections 873a are arranged inside the radius of the toothed rim 817a.

Figure 14:
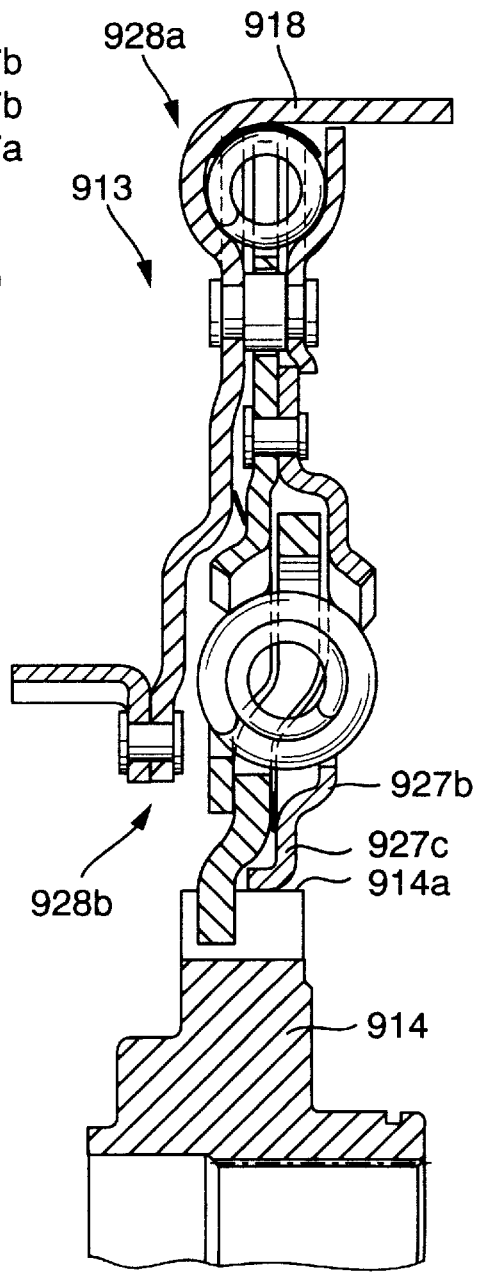
FIG. 14 represents a modified version of the damper of the embodiment of FIG. 13.

FIG. 14 illustrates a damper 913 that has been modified in comparison to the damper 813 of FIG. 13 in that the disk-shaped input member 927b of the second damper stage is shaped at its interior periphery in such a manner that by means of an axially directed extension 927c, the damper 913 can be centered on the exterior toothed profile 914a of the hub 914. By means of the centering feature 988, the first damper stage 928a can be centered on the second damper stage 928b. The axially and rotationally fixed connection of the input member 918 to the turbine shell (not shown) can thus be made with a tighter tolerance, e.g., according to the embodiment of FIG. 15.

An alternative to the solution shown in FIG. 13 for attaching the damper 813 to the turbine shell 823 by means of a connector flange 822 is illustrated in the detail view of FIG. 15. The rim 920a of the axially directed extension 920 of the input member 918 of the damper is adapted to the shape of the turbine shell 923 of the turbine 910 and attached along a circle by a continuous weld seam or individual spot welds 922a.

Figure 16:
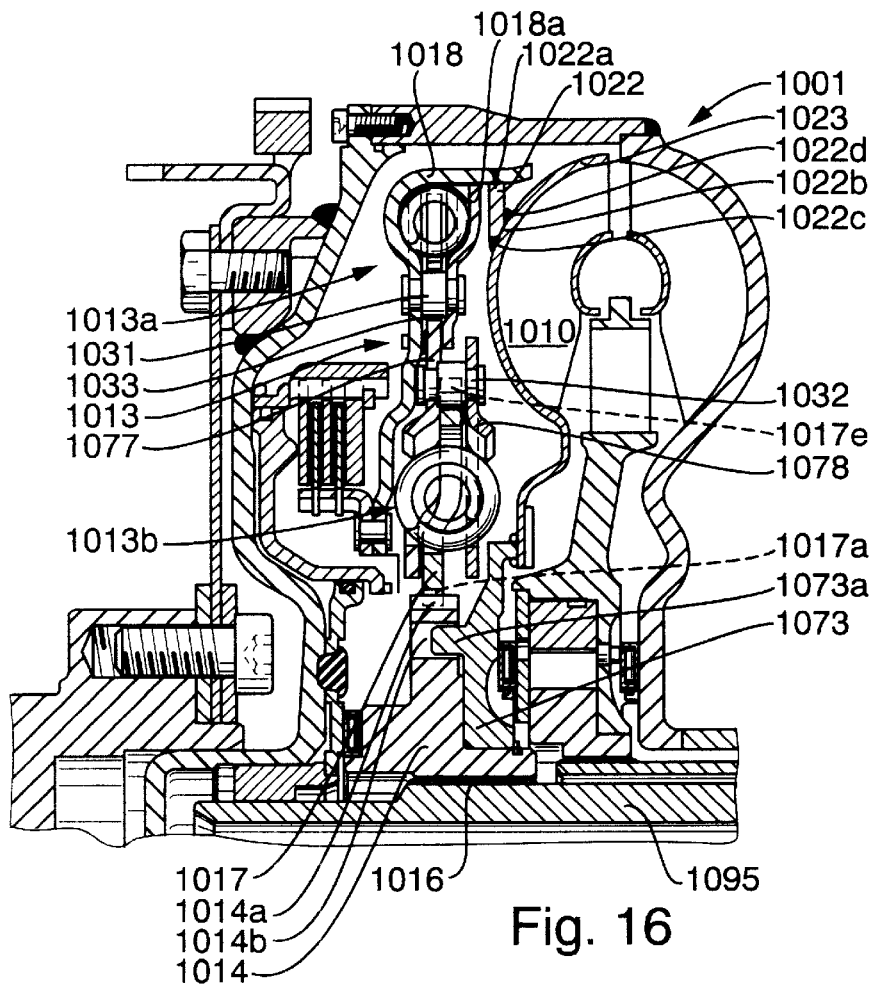
FIG. 16 represents an embodiment of a torque-transmitting apparatus comprising a damper that is docked fixedly to the turbine shell.

FIG. 16 shows a partial section of a further embodiment of a torque-transmitting apparatus device 1001 that is similar to the embodiment of FIG. 13. Modifications that deviate from the embodiment of FIG. 13 are in the hub area, including a hub 1014 that is also shown in the detail view of FIG. 17.

Figure 17:
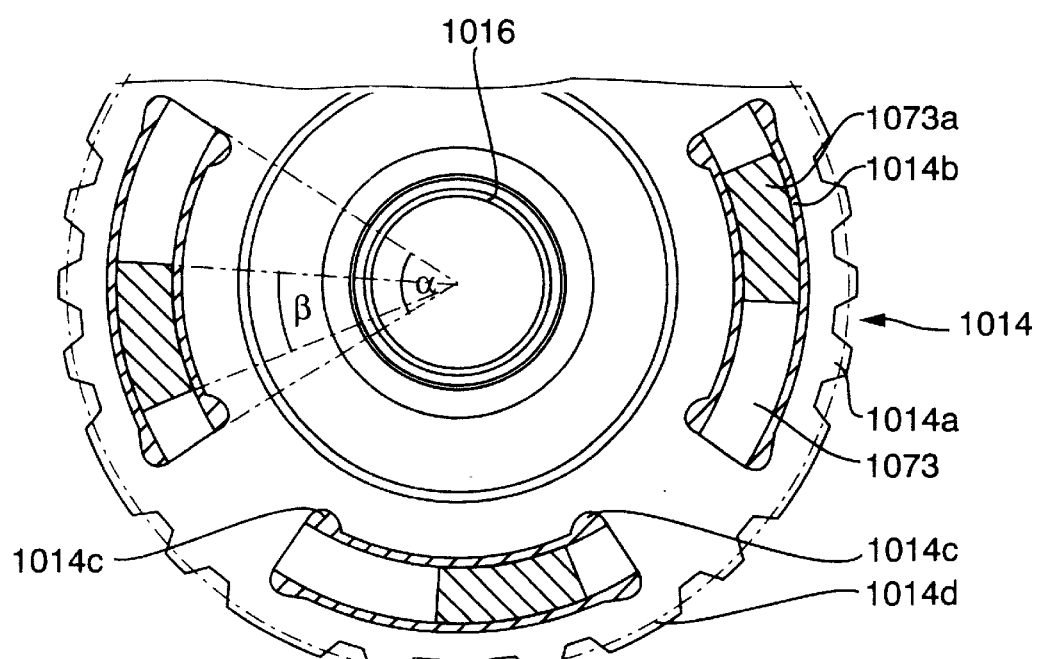
FIG. 17 represents a hub of the embodiment of FIG. 16.

As may be seen in FIGS. 16 and 17, the two form-locking connections for the transmission of the torque from the damper 1013 through its output member 1017, and from the turbine 1010 through the turbine hub 1073, to the hub 1014 and from there through the toothed-profile connection 1016 to the transmission shaft are spatially separated from each other. At its exterior circumference, the hub 1014 has an outward-facing profile, such as the illustrated toothed rim 1014a, that meets the complementary interior profile 1017a of the output member 1017 in a form-fitting engagement that is preferably free of play and permits axial displacement. Inside of the toothed rim of the hub 1014 are window-shaped openings 1014b distributed along a circle, shown here in an arrangement of four, but arrangements of two or six openings may also be advantageous. The axially directed projections 1073*a* of the turbine hub 1073 pass through the window-shaped openings 1014*b* and establish a positive engagement with a maximum play angle a–b (amounting to, e.g., 10° to 70° in the case where four openings are used), between the hub 1014 and the turbine hub 1073 that is rotatable and axially constrained on the hub 1014, whereby the maximum angular working range a–b of the damper 1013 is being determined in an advantageous manner. For reasons of structural integrity, the openings 1014*b* are widened and rounded in both radial directions in the vicinity 1014*c* of the contact areas for the projections 1073*a*. The toothed rim profile 1014*a* is interrupted in the circumference segments 1014*d* adjacent to the radial enlargements 1014*c*.

The axial fixation of the damper 1013 is modified slightly in comparison to the embodiment 801 of FIG. 13 in that, unlike the connector flange 822 of FIG. 13, the connector flange 1022 is not fitted to the radial shape of the turbine shell 1023 and then continued in an outward radial direction. Rather, the connector flange 1022 has a planar, radially outward-directed shape with a taper 1022*b* at the contact surface to the turbine shell 1023 and is connected to the latter preferably at its inner perimeter through weld seams or a string of evenly distributed spot welds 1022*c*, 1022*d*. The connection 1022*a* between the connector flange 1022 and the input member 1018 of the damper 1013 is made in the same manner as in the embodiment 801 shown in FIG. 13.

The function of the damper 1013, likewise, is similar to the dampers 213, 813 of the FIGS. 3 and 13, respectively, where it should be noted that the dampers shown in the illustrated sample embodiments are serially configured two-stage dampers. However, in applying the invention it may also be of advantage to provide a parallel mode of operation for dampers with two or more stages. It may further be beneficial, to provide individual limits for the angular displacement of each damper stage, as in the present case for the damper stages 1013*a*, 1013*b*, in addition to the delimitation of the relative angular displacement of the entire damper 1013 by means of the projections 1073*a* in combination with the openings 1014*b*. For this purpose, the first damper stage 1013*a* as well as its output member 1077 have window-shaped openings 1033 distributed along a circle that are engaged with angular play by the rivet bolts 1031 that connect the two input members 1018, 1018*a*. In case of a rotation of the input members 1018, 1018*a* relative to the output member 1077 of the first damper stage 1013*a*, when the range of play has been used up, the rivet bolts will act as stops and thereby cause the damper stage 1013*a* to be bypassed.

In analogous manner, the rivet bolts 1032 connecting the input member 1077 of the second damper stage 1013*b* (which also represents the output member of the first damper stage 1013*a*) with the disk-shaped part 1078 restrict the angular displacement of the second damper stage 1013*b* as they perform the function of rotation-limiting stops for the radially directed extremities 1017*e* on the circumference of the output member 1017, whereby the range of relative rotation between the input members 1077, 1078 and the output member 1017 is determined by the amount of play between the rivet bolts 1032 and the extremities 1017*e*. Preferably, the ranges between stops for the first and second damper stages 1013*a*, 1013*b* as well as for the entire damper are coordinated in such a manner that the individual damper stages 1013*a*, 1013*b* reach their stops at a point before the limit angle of the entire damper has been attained by the projections 1073*a* reaching the end of their play. For specific applications it may further be advantageous if the first damper stage is stopped before the second stage or vice versa.

It must be understood that features and functions described for individual embodiments of the torque-transmitting apparatus can also be advantageously applied in the rest of the embodiments, regardless of whether or not they are being shown, even if these features and functions have not been described in detail in the context of the respective embodiment and that, therefore, such features and functions are considered to be included in the coverage of all embodiments to which they are applicable.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for transmitting torque comprising a hydrokinetic torque converter with at least one housing connectable to a driving shaft of a prime mover, the housing containing and imparting torque to at least one pump and also containing a rotary turbine connectable to and arranged to drive an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member having a radially outer portion in form-locking engagement with the turbine.

2. The apparatus of claim 1, wherein the input member is connected to an engageable and disengageable lockup cluch.

3. The apparatus according to claim 2, wherein the lockup clutch includes means for establishing a force-locking connection between the housing and the damper.

4. The apparatus according to claim 2, wherein the lockup clutch has at least one friction-lining carrier with at least one friction lining.

5. The apparatus according to claim 4, wherein the friction-lining carrier includes an annular disk and said lockup clutch comprises friction linings flanking a radially outer zone of said disk.

6. The apparatus according to claim 4, wherein the friction-lining carrier is connected to the input member of the damper by means of an axial plug-in connection.

7. The apparatus according to claim 6, wherein the axial plug-in connection is a toothed connection.

8. The apparatus according to claim 6, wherein the axial plug-in connection is constituted by a radially extending flange-like element.

9. The apparatus according to claim 8, wherein the flange-like element is attached to, and extends radially outwardly relative to a shell of the turbine.

10. The apparatus according to claim 6, wherein the axial plug-in connection is constituted by a flange-like element having an axially directed portion.

11. The apparatus according to claim 6, wherein the axial plug-in connection is formed between a radially extending element and an axially extending element, and wherein further the radially extending element has an outward-directed toothed profile and the axially extending element has an axially directed toothed profile.

12. The apparatus according to claim 2, wherein the lockup clutch is a disk clutch.

13. The apparatus according to claim 2, wherein the lockup clutch is controlled by an axially moveable control piston.

14. The apparatus according to claim 13, wherein the control piston is centered on, axially movable in relation to, and sealed against the transmission shaft.

15. The apparatus according to claim 2, wherein the lockup clutch carries friction linings in a radially outer zone that faces axially towards the housing.

16. The apparatus according to claim 2, wherein a component of the lockup clutch is connected to the input member of the damper.

17. The apparatus according to claim 2, wherein the damper comprises at least two damper stages.

18. The apparatus according to claim 17, wherein the two damper stages are configured to operate in series.

19. The apparatus according to claim 17, wherein the two damper stages comprise at least one common disk-like part.

20. The apparatus according to claim 17, wherein each damper stage has an input member and an output member and the input member and output member of each damper stage are rotatable relative to each other through equal angles.

21. The apparatus according to claim 17, wherein each damper stage has an input and an output members and the input member and output members of each damper stage are rotatable relative to each other within different angles.

22. The apparatus according to claim 17, wherein the damper is arranged to transmit torque both in a pull direction and a push direction, and at least one damper stage is inactive in one of said directions.

23. The apparatus according to claim 22, wherein the damper stage that is inactive in one of the directions comprises a bypass for connecting the input member with the output member when the damper stage is in an inactive mode.

24. The apparatus according to claim 23, wherein the bypass is effected by the mutual engagement of rotation-limiting stops provided on the input member and the output member.

25. The apparatus according to claim 17, wherein compression coil springs with different spring-rate characteristics are used as the energy-storing devices for the two damper stages.

26. The apparatus according to claim 17, wherein at least one arcuately pre-shaped compression coil spring extending approximately along an outer circumference of the damper is used as the energy-storing device for one of said damper stage.

27. The apparatus according to claim 17, wherein the energy-storing devices of at least one damper stage are uncoupled from the power flow before the energy-storing devices of another damper stage.

28. The apparatus according to one claim 2, wherein each of the input and output members of the damper comprises a lateral part.

29. The apparatus according to claim 2, wherein the input member and the output member are connected by engagement means evenly distributed along a circle, said engagement means comprising in one of said members a set of elongated holes with a dimension corresponding at least to a maximum angle of relative rotation between said members, and comprising in the other of said members a set of matching connector means engaging said elongated holes, whereby the input member and the output member are allowed to rotate relative to each other.

30. The apparatus according to claim 29, wherein at least one rotation-limiting stop is constituted by at least one connector means extendable into at least one end portion of at least one of the elongated holes.

31. The apparatus according to claim 2, wherein at least one force-introducing element for the energy-storing device is provided on each of the input and output members.

32. The apparatus according to claim 2, wherein said energy storing devices comprises compression coil springs.

33. The apparatus according to claim 2, wherein a form-locking engagement between the turbine and the input member is established radially outwardly of the energy-storing devices of the damper.

34. The apparatus according to claim 2, wherein the input member and the output member are rotatable relative to each other within an angle determined by at least one rotation-limiting stop.

35. The apparatus according to claim 34, wherein the rotation-limiting stop includes means for uncoupling the energy-storing devices of the damper from the power flow.

36. The apparatus according to claim 34, wherein the rotation-limiting stop includes a flange-like part arranged on the rotary output element, at least one extremity of the flange-like part being axially engaged in at least one opening formed along a perimeter of the input member, the opening having an angular width that determines a range of rotary play.

37. Apparatus for transmitting torque comprising a hydrokinetic torque converter with at least one housing connectable to a driving shaft of a prime mover, the housing containing and imparting torque to at least one pump and also containing a rotary turbine connectable to and arranged to drive an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member is connected to an engageable and disengageable lockup clutch, the input member and the turbine being at least indirectly form-lockingly connected to each other by means of an axial plug-in connection.

38. The apparatus according to claim 37, wherein the torque converter further includes a stator interposed between the pump and the turbine.

39. The apparatus according to claim 37, wherein the input shaft of the power train is a transmission shaft.

40. Apparatus for transmitting torque comprising a hydrokinetic torque converter with at least one housing connectable to a driving shaft of a prime mover, the housing containing and imparting torque to at least one pump and also containing a rotary turbine connectable to and arranged to drive an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member is connected to an engageable and disengageable lockup clutch, wherein the lockup clutch is controlled by an axially moveable control piston and the control piston in an engaged state of the lockup clutch forms a plenum chamber with an essentially tight separation from a chamber formed by the housing.

41. Apparatus for transmitting torque comprising a hydrokinetic torque converter with at least one housing connectable to a driving shaft of a prime mover, the housing containing and imparting torque to at least one pump and also containing a rotary turbine connectable to and arranged to drive an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member is connected to an engageable and disengageable lockup clutch, wherein the lockup clutch is controlled by an axially moveable control piston, and the control piston is axially movable relative to the housing and has an outside perimeter along which the control piston is sealed against the housing.

42. Apparatus for transmitting torque comprising a hydrokinetic torque converter with at least one housing connectable to a driving shaft of a prime mover, the housing containing and imparting torque to at least one pump and also containing a rotary turbine connectable to and arranged to at an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member is connected to an engageable and disengageable lockup clutch, wherein the lockup clutch is controlled by an axially moveable control piston and the control piston has a form-locking engagement with the housing.

43. The apparatus according to claim 42, wherein the form-locking engagement is formed by complementary axially oriented profiles of the control piston and the housing.

44. The apparatus according to claim 43, wherein the axially oriented profiles are formed by alternating ridges and grooves in the shape of ring segments that are distributed over the outside perimeter where the ridges of the control piston engage the grooves of the housing.

45. Apparatus for transmitting torque comprising a hydrokinetic torque converter with at least one housing connectable to a driving shaft of a prime mover, the housing containing and imparting torque to at least one pump and also containing a rotary turbine connectable to and arranged to drive an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member is connected to an engageable and disengageable lockup clutch, wherein the lockup clutch has at least one friction-lining carrier with at least one friction lining, and the lockup clutch is controlled by an axially movable control piston and the friction-lining carrier is interposed axially between the control piston and a pressure plate and has an axial attachment to the housing along a radially outer portion of the pressure plate.

46. The apparatus according to claim 45, wherein the pressure plate has at least one opening to allow damper fluid to pass through.

47. Apparatus for transmitting torque comprising a hydrokinetic torque converter with at least one housing connectable to a driving shaft of a prime mover, the housing containing and imparting torque to at least one pump and also containing a rotary turbine connectable to and arranged to drive an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member is connected to an engageable and disengageable lockup clutch, wherein the lockup clutch has at least one friction-lining carrier with at least one friction lining, and the lockup clutch is controlled by an axially moveable control piston and the friction-lining carrier is centered on the control piston by means of lugs protruding axially from the friction-lining carrier towards the housing and engaging a shoulder that is formed on the control piston and extends in an axial direction away from the friction-lining carrier.

48. Apparatus for transmitting torque comprising a hydrokinetic torque converter with at least one housing connectable to a driving shaft of a prime mover, the housing containing and imparting torque to at least one pump and also containing a rotary turbine connectable to and arranged to drive an input shaft of a power train, and with further at least one damper arranged in a power flow path between the turbine and a rotary output element of the apparatus, the damper having an input member constrained to rotate with the turbine and an output member connected to the rotary output element, the input member and the output member being rotatable relative to each other at least against the opposition of a restoring force of energy-storing devices arranged between them, and the input member is connected to an engageable and disengageable lockup clutch, wherein a lateral part constituting the input member is bent along an inside perimeter to extend axially towards the lockup clutch and has an axially directed toothed profile in form-locking engagement with a radially inward-directed toothed profile at an inner perimeter of the lockup clutch.

49. The apparatus according to claim 48, wherein the form-locking engagement permits axial movement of the lateral part and the lockup clutch relative to each other.

* * * * *